(12) United States Patent
Valsvik et al.

(10) Patent No.: US 9,891,333 B2
(45) Date of Patent: Feb. 13, 2018

(54) TOUCH DOWN MONITORING OF AN OCEAN BOTTOM SEISMIC NODE

(71) Applicant: Seabed Geosolutions B.V., Leidschendam (NL)

(72) Inventors: Geir Valsvik, Laksevag (NO); Arne Henning Rokkan, Olsvik (NO); Jean-Baptiste Danre, Bergen (NO); Bjarne Isfeldt, Mathopen (NO)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 93 days.

(21) Appl. No.: 14/925,758

(22) Filed: Oct. 28, 2015

(65) Prior Publication Data

US 2016/0124105 A1    May 5, 2016

Related U.S. Application Data

(60) Provisional application No. 62/072,259, filed on Oct. 29, 2014.

(51) Int. Cl.
*G01V 1/38*  (2006.01)
*B63G 8/00*  (2006.01)

(52) U.S. Cl.
CPC ........... *G01V 1/3852* (2013.01); *B63G 8/001* (2013.01); *G01V 1/3835* (2013.01)

(58) Field of Classification Search
CPC ..... G01V 1/3852; G01V 1/3835; B63G 8/001
(Continued)

(56) References Cited

U.S. PATENT DOCUMENTS

| 4,120,167 A | 10/1978 | Denman |
| 5,497,356 A | 3/1996 | Norton, Jr. |

(Continued)

FOREIGN PATENT DOCUMENTS

| WO | 2014/076075 | 5/2014 |
| WO | 2014/090811 | 6/2014 |
| WO | 2014/147165 | 9/2014 |

OTHER PUBLICATIONS

Anderson, Brian and Todd, Chiristi, Ocean Bottom Nodes in Operation, ENGINEERLIVE, Feb. 5, 2013. Downloaded Jun. 16, 2014 from: http://www.engineerlive.com/content/23251.

(Continued)

*Primary Examiner* — Daniel L Murphy
(74) *Attorney, Agent, or Firm* — Park, Vaughan, Fleming & Dowler LLP; Shane Nelson

(57) ABSTRACT

Apparatuses, systems, and methods for guiding and/or positioning a plurality of seismic nodes on or near the seabed by an autonomous underwater vehicle (AUV) or a remotely operated vehicle (ROV). In one embodiment, an underwater vehicle is configured to monitor the deployment of cable connected to a plurality of seismic nodes, including the touchdown monitoring, positioning, and guiding of deployed autonomous seismic nodes or ocean bottom cable. The underwater vehicle may comprise a propulsion system configured to steer and propel the vehicle in a body of water, a tracking system configured to automatically track the cable and/or attached seismic nodes, and a guidance system configured to communicate with a surface vessel node data in real time or near real time for active guidance and/or positioning of the deployment cable.

28 Claims, 12 Drawing Sheets

(58) Field of Classification Search
USPC .......................................................... 367/15
See application file for complete search history.

(56) References Cited

U.S. PATENT DOCUMENTS

| | | | |
|---|---|---|---|
| 5,894,450 | A | 4/1999 | Schmidt |
| 6,024,344 | A | 2/2000 | Buckley |
| 6,113,312 | A | 9/2000 | Norholmen |
| 6,354,764 | B1 | 3/2002 | Brown |
| 6,474,254 | B1 | 11/2002 | Ambs |
| 6,951,138 | B1 | 10/2005 | Jones |
| 7,190,634 | B2 | 3/2007 | Lambert |
| 7,310,287 | B2 | 12/2007 | Ray |
| 7,646,670 | B2 | 1/2010 | Maxwell |
| 7,675,821 | B2 | 3/2010 | Berg |
| 7,883,292 | B2 | 2/2011 | Thompson |
| 8,075,226 | B2 | 12/2011 | Thompson |
| 8,427,900 | B2 | 4/2013 | Fleure |
| 8,675,446 | B2 | 3/2014 | Gateman |
| 8,717,844 | B2 | 5/2014 | Welker |
| 9,090,319 | B2 | 7/2015 | Brizard |
| 9,151,857 | B2 | 10/2015 | Manin |
| 2004/0013471 | A1 | 1/2004 | Matthews |
| 2005/0276665 | A1 | 12/2005 | Entralgo |
| 2006/0054074 | A1 | 3/2006 | Wingett |
| 2006/0159524 | A1 | 7/2006 | Thompson |
| 2011/0266086 | A1 | 11/2011 | Welker |
| 2013/0083623 | A1* | 4/2013 | Brizard ................ G01V 1/3852 367/15 |
| 2014/0204708 | A1 | 7/2014 | Muijzert |
| 2014/0301161 | A1 | 10/2014 | Brizard |
| 2015/0316675 | A1 | 11/2015 | Brizard |

OTHER PUBLICATIONS

Krogh, Bo, How to Save Time in Offshore Survey Operations, Hydro International, Jul. 2008, vol. 12, No. 6 GIM International. Downloaded Oct. 22, 2014 from: http://www.hydro-international.com/issues/articles/id943-How_to_Save_Time_in_Offshore_Survey_Operations.html?printversie=1.

* cited by examiner

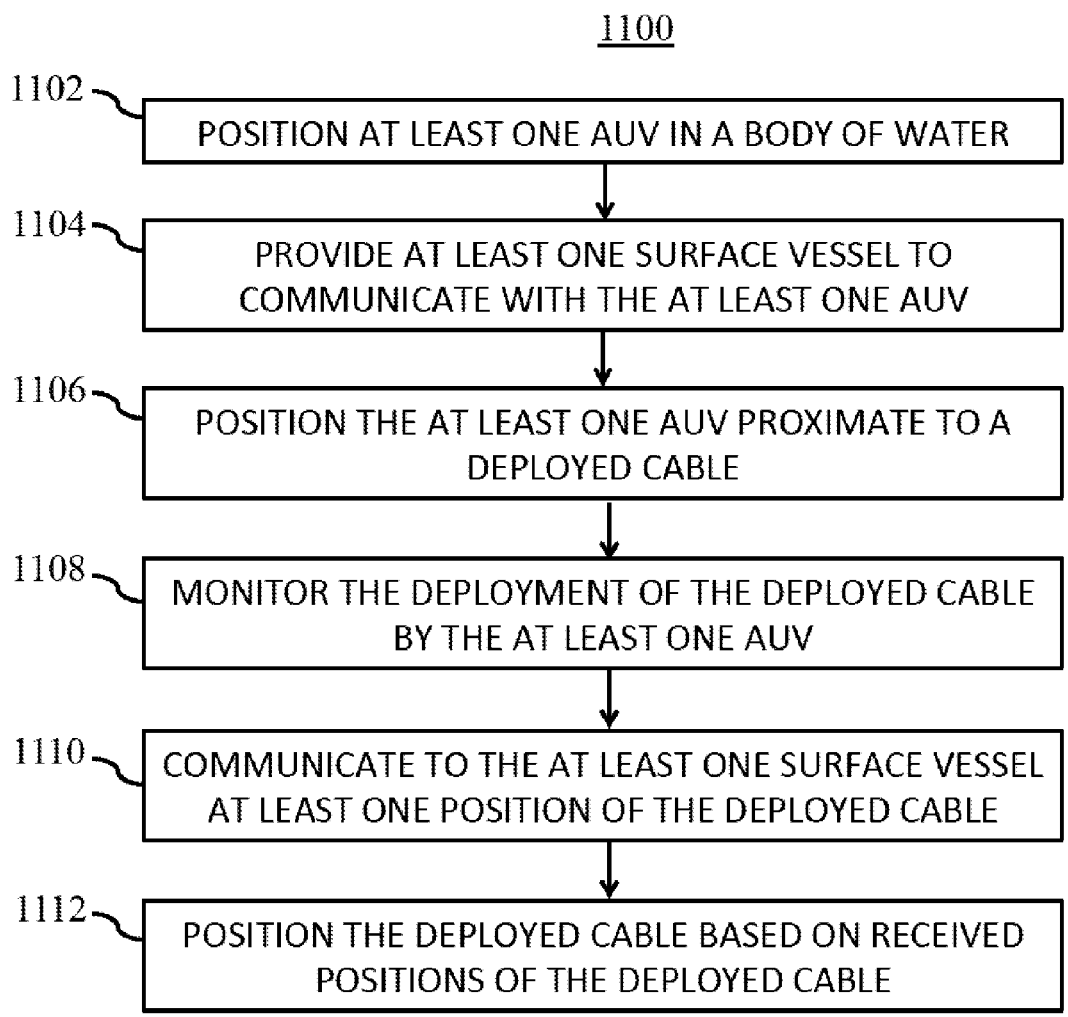

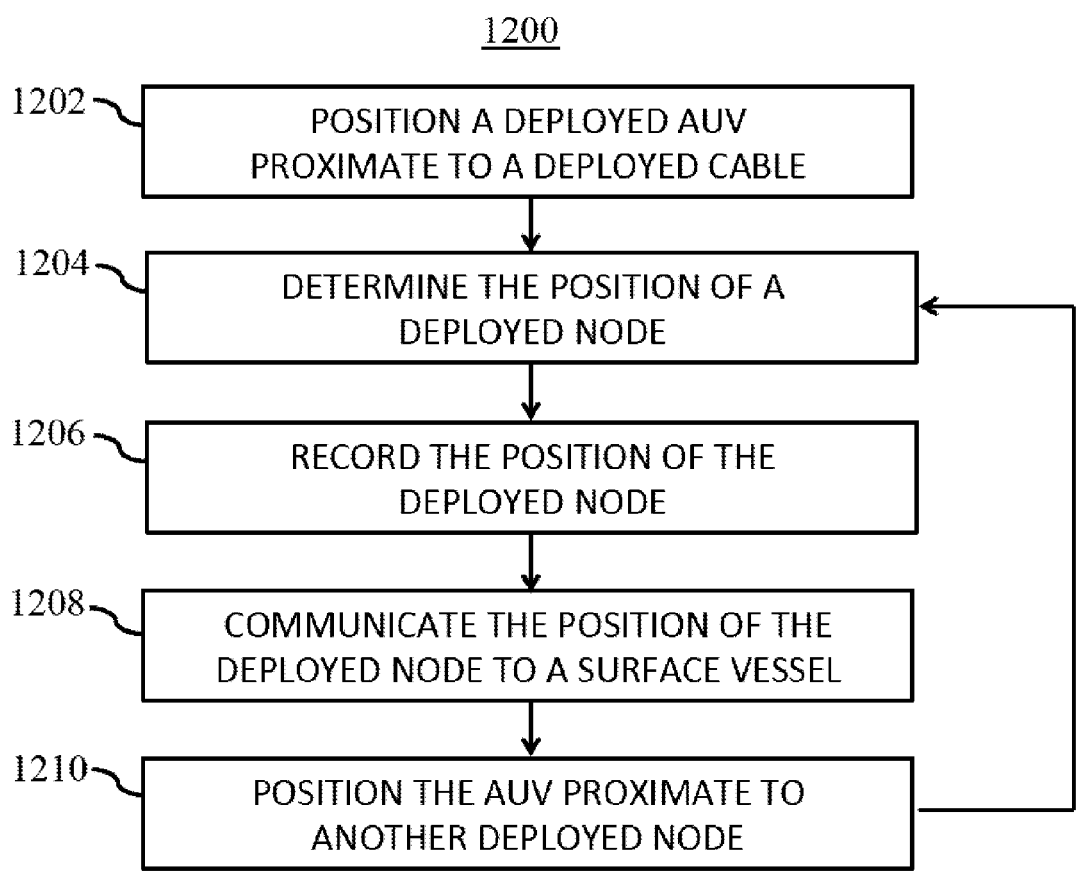

TOUCH DOWN MONITORING OF AN OCEAN BOTTOM SEISMIC NODE

PRIORITY

This application claims priority to U.S. provisional patent application No. 62/072,259, filed on Oct. 29, 2014, the entire content of which is incorporated herein by reference.

BACKGROUND OF THE INVENTION

Field of the Invention

This invention relates to marine seismology and more particularly relates to the use of an underwater vehicle for the touchdown monitoring of the deployment of a plurality of ocean bottom seismic nodes.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. Prior autonomous nodes include spherical shaped nodes, cylindrical shaped nodes, and disk shaped nodes. Other prior art systems include a deployment rope/cable with integral node casings or housings for receiving autonomous seismic nodes or data recorders. Some of these devices and related methods are described in more detail in the following patents, incorporated herein by reference: U.S. Pat. Nos. 6,024,344; 7,310,287; 7,675,821; 7,646,670; 7,883,292; 8,427,900; and 8,675,446.

When a plurality of autonomous nodes attached to a cable, or an ocean bottom cable, is deployed in the sea, it is desirable to know the position of the cable and the positions of the nodes during and after deployment. One common way to identify some portions of the deployed cable is to use acoustic positioning transponders that are selectively placed at various portions of the cable. The transponders may transmit an acoustic signal to a marine vessel that indicates the position of the transponders on the sea floor, which indications the position of selected portions of the cable. However, many problems exist with the use of transponders. Because transponders are expensive, they are used infrequently on segments of the deployment cable, often at intervals of 300 meters or more. In operation, cable is laid down not in perfect lines or patterns on the seabed, and thus the exact location of entire sections of cable (and the relevant seismic nodes) are effectively unknown between the transponders. Further, communications using transponders is very limited and does not provide the needed accuracy or real-time communications ability to guide the positioning of the deployed cable as it is being deployed. Still further, the use of transponders provides no clear evidence data that touchdown (i.e., the point of contact of a node to the seabed) has effectively occurred, particularly as to each node. Recording seismic signals from the seabed requires proper positioning of the node and/or sensor on the seabed and effective seismic coupling between the node and the seabed. Different orientations and improper configurations inhibit the coupling of the seismic sensor to the seabed, providing poor or inaccurate data. Still further, the deployment and retrieval of transponders requires additional equipment on the deployment vessel and additional time for the handling of such transponders.

A need exists for an improved method and system for the monitoring and/or guiding of cable deployed with nodes on the seabed, and in particular one that eliminates all or substantially all of the transponders typically used in such applications. A new system is needed that is more cost effective, allows better positioning and accuracy of deployed nodes, allows for the real-time (or near real-time) guidance of the deployment cable, and provides confirmation that effective touchdown has occurred.

SUMMARY OF THE INVENTION

Apparatuses, systems, and methods for guiding and/or positioning a plurality of seismic nodes on or near the seabed by an autonomous underwater vehicle (AUV) or a remotely operated vehicle (ROV). In one embodiment, an underwater vehicle is configured to monitor the deployment of cable connected to a plurality of seismic nodes, including the touchdown monitoring, positioning, and guiding of deployed autonomous seismic nodes or ocean bottom cable. The underwater vehicle may comprise a propulsion system configured to steer and propel the vehicle in a body of water, a tracking system configured to automatically track the cable and/or attached seismic nodes, and a guidance system configured to communicate with a surface vessel node data in real time or near real time for active guidance and/or positioning of the deployment cable.

In one embodiment, the disclosed system comprises a plurality of seismic nodes, a surface vessel configured to deploy the plurality of seismic nodes in a body of water by a deployment cable, and at least one underwater vehicle (such as an AUV or ROV) configured to track the deployment of the nodes and/or cable. The underwater vehicle may be configured to communicate to the surface vessel one or more positions of the deployed nodes and/or cable. The surface vessel may be able to modify the position of the deployed cable and/or nodes based upon the communications provided by the underwater vehicle.

In one embodiment, disclosed is a subsea tracking system for the deployment of a plurality of seismic nodes on the seabed that comprises a node tracking system that is configured to detect the position of each of the plurality of seismic nodes during deployment to the seabed and a cable tracking system configured to detect a portion of a cable between each of the plurality of seismic nodes. The subsea tracking system may also comprise a communications system configured to transmit the position of the each of the plurality of nodes to a surface vessel. The subsea tracking system may be located on an AUV or an ROV or other underwater vehicle. The cable tracking system may comprise a metal tracking system configured to track the cable between each of the nodes. In other embodiments, the cable tracking system may comprise a sonar, radar, camera, or other tracking system configured to track the cable between each of the plurality of nodes. The node tracking system may comprise a sonar, radar, camera, or other tracking system configured to track each of the plurality of nodes. The subsea tracking system may be configured to monitor the touchdown position of each of the deployed nodes and record the node ID, position, depth, and height of the node position during touchdown and/or at a plurality of subsea positions.

In one embodiment, a method is disclosed for the deployment of a plurality of seismic nodes on or near the seabed, comprising positioning an underwater vehicle proximate to the seabed, deploying a plurality of seismic nodes from a surface vessel that are coupled to a deployment cable, positioning the underwater vehicle near a first position of the deployment cable, determining the node position of a first node of the plurality of seismic nodes by the AUV, recording the node position by the underwater vehicle, and communicating to the surface vessel the node position. The method may also include monitoring the touchdown position of the plurality of seismic nodes and communicating such positions to a surface vessel. The method may also include varying the deployment cable and/or the position on the seabed based upon communications provided by the underwater vehicle, such as the touchdown position of one or more of the plurality of nodes, the predicted touchdown position of one or more of the plurality of nodes, and/or the difference between the actual touchdown position of a node and a predetermined seabed position of the node.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 11 illustrates one method of using an AUV to monitor node deployment.

FIG. 12 illustrates one method of using an AUV to monitor node deployment.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Node Deployment

Figure 1A:
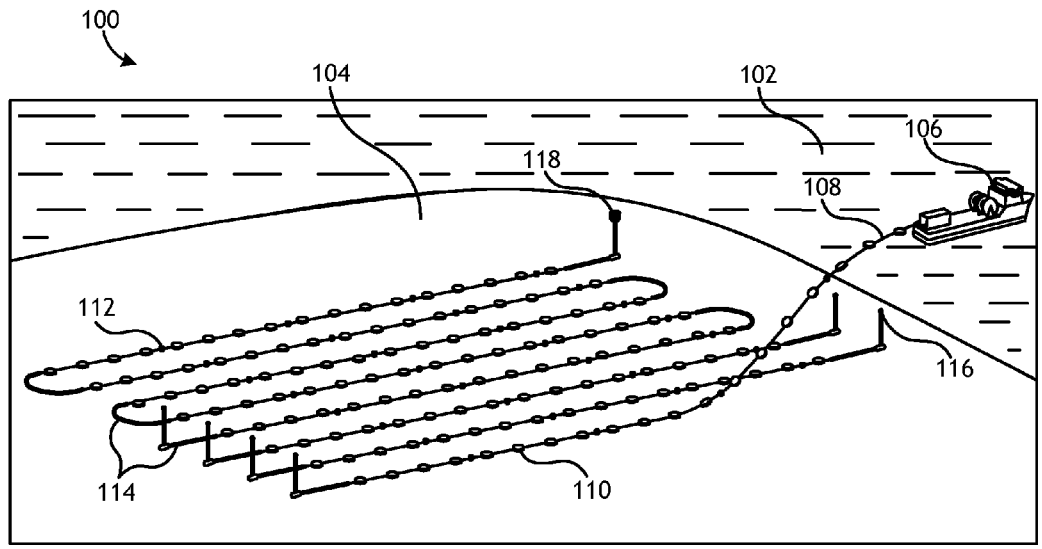
FIG. 1A is a schematic diagram illustrating one embodiment of a system for marine deployment of an autonomous seismic node.
Figure 1B:
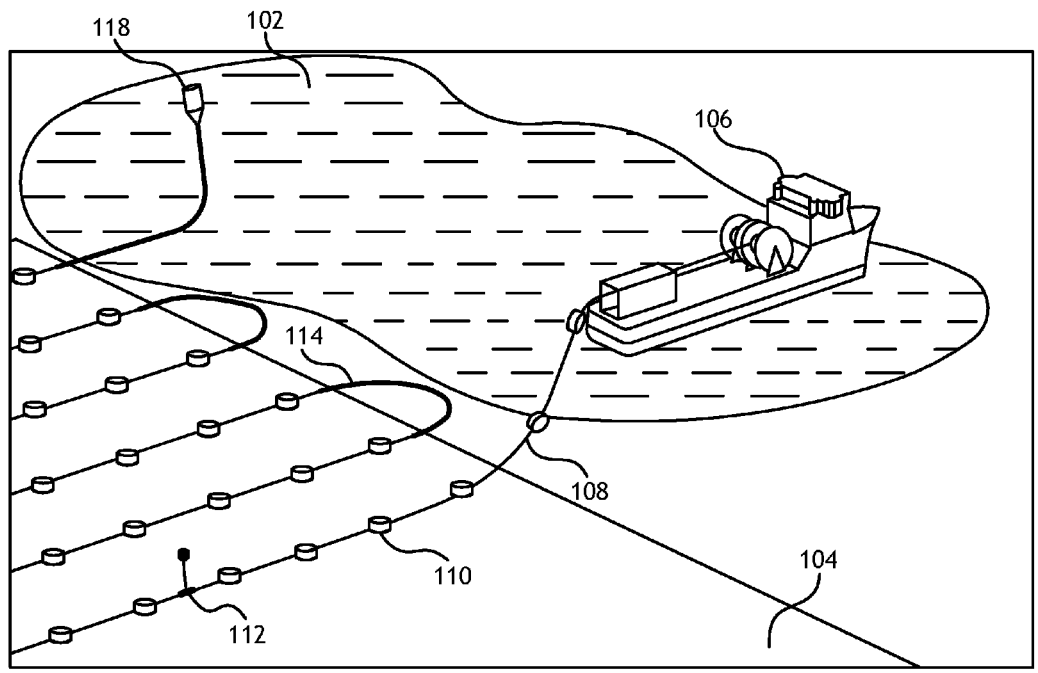
FIG. 1B is a schematic diagram illustrating one embodiment of a system for marine deployment of an autonomous seismic node.

FIGS. 1A and 1B illustrate a layout of a seabed seismic recorder system that may be used with autonomous seismic nodes for marine deployment. FIG. 1A is a diagram illustrating one embodiment of a marine deployment system 100 for marine deployment of seismic nodes 110. One or more marine vessels deploy and recover a cable (or rope) with attached sensor nodes according to a particular survey pattern. In an embodiment, the system includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108 (i.e., deployment cables). One or more seismic nodes 110 may be attached directly to the deployment line 108. Additionally, the marine deployment system 100 may include one or more acoustic positioning transponders 112, one or more weights 114, one or more pop up buoys 116, and one or more surface buoys 118. As is standard in the art, weights 114 can be used at various positions of the cable to facilitate the lowering and positioning of the cable, and surface buoys 118 or pop up buoys 116 may be used on the cable to locate, retrieve, and/or raise various portions of the cable. Acoustic positioning transponders 112 may also be used selectively on various portions of the cable to determine the positions of the cable/sensors during deployment and post deployment. The acoustic positioning transponders 112 may transmit on request an acoustic signal to the marine vessel for indicating the positioning of seismic nodes 110 on sea floor 104. In an embodiment, weights 114 may be coupled to deployment line 108 and be arranged to keep seismic nodes 110 in a specific position relative to sea floor 104 at various points, such as during start, stop, and snaking of deployment line 108.

FIG. 1B is a close-up view illustrating one embodiment of a system 100 for marine deployment of seismic nodes 110. In an embodiment, deployment line 108 may be a metal cable (steel, galvanized steel, or stainless steel). Alternatively, deployment line 108 may include chain linkage, rope (polymer), wire, or any other suitable material for tethering to marine vessel 106 and deploying one or more seismic nodes 110. In an embodiment, deployment line 108 and seismic nodes 110 may be stored on marine vessel 106. For example, the deployment line may be stored on a spool or reel or winch. Seismic nodes 110 may be stored in one or more storage containers. One of ordinary skill may recognize alternative methods for storing and deploying deployment line 108 and seismic nodes 110.

In one embodiment, deployment line 108 and seismic nodes 110 are stored on marine vessel 106 and deployed from a back deck of vessel 106, although other deployment locations from the vessel can be used. As is well known in the art, deployment line 108, such as a rope or cable, with a weight attached to its free end is dropped from the back deck of the vessel. Seismic nodes 110 are preferably directly attached in-line to deployment line 108 at a regular, variable, or selectable interval (such as 25 meters) while deployment line 108 is lowered through the water column and draped linearly or at varied spacing onto the seabed. During recovery each seismic node 110 may be clipped off deployment line 108 as it reaches deck level of vessel 106. Preferably, nodes 110 are attached directly onto deployment line 108 in an automated process using node attachment or coupling machines on board the deck of the marine vessel 106 at one or more workstations or containers. Likewise, a node detaching or decoupling machine is configured to detach or otherwise disengage seismic nodes 110 from deployment line 108. Alternatively, seismic nodes 110 can be attached via manual or semi-automatic methods. Seismic nodes 110 can be attached to deployment line 108 in a variety of configurations, which allows for free rotation with self-righting capability of seismic node 110 about deployment line 108 and allows for minimal axial movement on deployment line 108 (relative to the acoustic wave length). For example, deployment line 108 can be attached to the top, side, or center of seismic node 110 via a variety of configurations.

Once deployment line 108 and seismic nodes 110 are deployed on sea floor 104, a seismic survey can be performed. One or more marine vessels 106 may contain a seismic energy source (not shown) and transmit acoustic signals to sea floor 104 for data acquisition by seismic nodes 110. Embodiments of system 100 may be deployed in both coastal and offshore waters in various depths of water. For example, the system may be deployed in a few meters of water or up to several thousand meters of water. In some configurations surface buoy 118 or pop up buoy 116 may be retrieved by marine vessel 106 when seismic nodes 110 are to be retrieved from seabed 104. Thus, system 110 may not require retrieval by means of a submersible or diver. Rather, pop up buoy 116 or surface buoy 118 may be picked up on water surface 102 and deployment line 108 may be retrieved along with seismic nodes 110.

As mentioned above, to perform a seismic survey that utilizes autonomous seismic nodes, those nodes must be deployed and retrieved from a vessel, typically a surface vessel. In one embodiment a node storage and service system is coupled to one or more deployment systems. The node storage and service system is configured to handle, store, and service the nodes before and after the deployment and retrieval operations performed by a node deployment system. Such a node storage and service system is described in more detail in U.S. patent application Ser. No. 14/711,262, filed on May 13, 2015, incorporated herein by reference. Such a node deployment system is described in more detail in U.S. patent application Ser. No. 14/820,285, filed on Aug. 6, 2015, entitled Overboard System for Deployment and Retrieval of Autonomous Seismic Nodes, incorporated herein by reference.

Autonomous Seismic Node Design

Figure 2A:
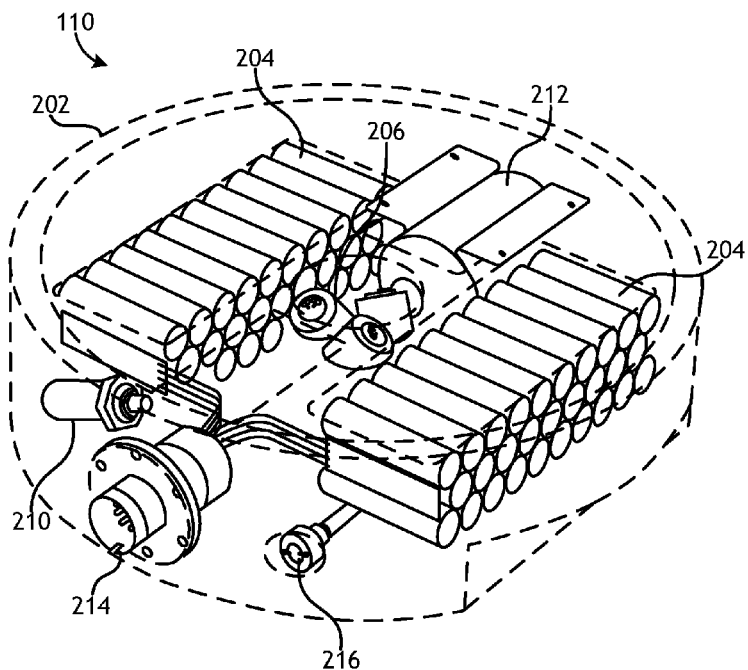
FIG. 2A illustrates a perspective view diagram of one embodiment of an autonomous seismic node.

FIG. 2A illustrates a perspective view diagram of autonomous ocean bottom seismic node 110. Seismic node 110 may include body 202, such as a housing, frame, skeleton, or shell, which may be easily dissembled into various components. Additionally, seismic node 110 may include one or more power sources 204. Additionally, the seismic node may include pressure release valve 216 configured to release unwanted pressure from seismic node 110 at a pre-set level. The valve protects against fault conditions like water intrusion and outgassing from a battery package. Additionally, the seismic node may include electrical connector 214 configured to allow external access to information stored by internal electrical components, data communication, and/or power transfer. During the deployment the connector is covered by pressure proof watertight cap 218 (shown in FIG. 2B). In other embodiments, the node does not have an external connector and data is transferred to and from the node wirelessly, such as via wireless electromagnetic or optical links. In other embodiments, there may be multiple connectors on the node, one for data transfer and one connector for power transfer.

In an embodiment, the internal electrical components may include one or more hydrophones 210, one or more (preferably three) geophones 206 or accelerometers, and data recorder 212. In an embodiment, data recorder 212 may be a digital autonomous recorder configured to store digital data generated by the sensors or data receivers, such as hydrophone 210 and the one or more geophones or accelerometers 206. One of ordinary skill will recognize that more or fewer components may be included in seismic node 110. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures at the bottom of the ocean, as is well known in the art. In an embodiment, the seismic node includes one or more components configured for wireless transmission of data to and from the node via electromagnetic or optical components. Data can be retrieved from the node during deployment or, more preferably, from the node while the node is on board the marine vessel.

In an embodiment, power source 204 may be lithium-ion battery cells or rechargeable battery packs for an extended endurance (such as 90 days) on the seabed, but one of ordinary skill will recognize that a variety of alternative battery cell types or configurations may also be used. In one embodiment, the power source for each node is one or more sets of rechargeable batteries that can operate in a sealed environment, such as lithium, nickel, lead, and zinc based rechargeable batteries. Numerous rechargeable battery chemistries and types with varying energy densities may be used, such as lithium ion, lithium ion polymer, lithium ion iron phosphate, nickel metal hydride, nickel cadmium, gel lead acid, and zinc based batteries. Various rechargeable battery chemistries offer different operating parameters for safety, voltage, energy density, weight, and size. For example, voltage for a lithium ion battery may offer 3.6V with an energy density of 240 Wh/kg and 550 Wh/L. In various embodiments, the battery cell(s) may include a lithium-ion battery cell or a plurality of lithium-ion windings. In another embodiment, the battery cell may include a lithium-ion electrode stack. The shape and size of the battery cell(s) may be configured according to the power, weight, and size requirements of the seismic sensor node. One of ordinary skill will recognize a variety of battery cell types and configurations that may be suitable for use with the present embodiments. In some embodiments, the rechargeable battery pack includes a plurality of battery cells.

Figure 2B:
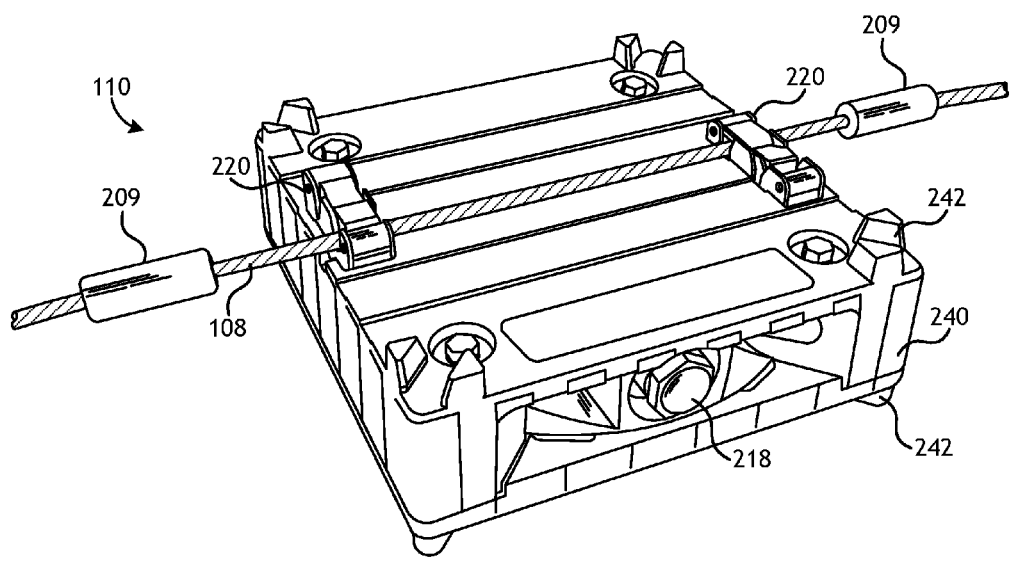
FIG. 2B illustrates a perspective view diagram of another embodiment of an autonomous seismic node.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or pressure housing that contains all of the node's internal components. In another embodiment, the pressurizing node housing is partially and/or substantially surrounded by a non-pressurized node housing that provides the exterior shape, dimensions, and boundaries of the node. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. While the node may be geometrically symmetrical about its central axis, symmetry is not a requirement. Further, the individual components of the node may not be symmetrical, but the combination of the various components (such as the pressurized housing and the non-pressurized housing) provide an overall mass and buoyancy symmetry to the node. In one embodiment, the node is approximately 350 mm×350 mm wide/deep with a height of approximately 150 mm. In one embodiment, body 202 of the node has a height of approximately 100 mm and other coupling features, such as node locks 220 or protrusions 242, may provide an additional 20-50 mm or more height to the node.

In another embodiment, as shown in FIG. 2B, the node's pressure housing may be coupled to and/or substantially surrounded by an external non-pressurized node housing 240. Various portions of non-pressurized node housing 240 may be open and expose the pressurized node housing as needed, such as for hydrophone 210, node locks 220, and data/power transfer connection 214 (shown with a fitted pressure cap 218 in FIG. 2B). In one embodiment, the upper and lower portions of the housing include a plurality of gripping teeth or protrusions 242 for engaging the seabed and for general storage and handling needs. Non-pressurized node housing 240 provides many functions, such as protecting the node from shocks and rough treatment, coupling the node to the seabed for better readings (such as low distortion and/or high fidelity readings) and stability on the seabed, and assisting in the stackability, storing, alignment, and handling of the nodes. Each node housing may be made of a durable material such as rubber, plastic, carbon fiber, or metal, and in one embodiment may be made of polyurethane or polyethylene. In still other embodiments, seismic node 110 may include a protective shell or bumper configured to protect the body.

In one embodiment, seismic node 110 comprises one or more direct attachment mechanisms and/or node locks 220 that may be configured to directly attach seismic node 110 to a deployment line 108. This may be referred to as direct or in-line node coupling. In one embodiment, the attachment mechanism 220 comprises a locking mechanism to help secure or retain the deployment line 108 to the seismic node 110. A plurality of direct attachment mechanisms may be located on any surfaces of the node 110 or node housing 240. In one embodiment, a plurality of node locks 220 is positioned substantially in the center and/or middle of a surface of a node or node housing. The node locks may attach directly to the pressure housing and extend through the node housing 240. In this embodiment, a deployment line, when coupled to the plurality of node locks, is substantially coupled to the seismic node on its center axis. In some embodiments, the node locks may be offset or partially offset from the center axis of the node, which may aid the self-righting, balance, and/or handling of the node during deployment and retrieval. The node locks 220 are configured to attach, couple, and/or engage a portion of the deployment line to the node. Thus, a plurality of node locks 220 operates to couple a plurality of portions of the deployment line to the node. The node locks are configured to keep the deployment line fastened to the node during a seismic survey, such as during deployment from a vessel until the node reaches the seabed, during recording of seismic data while on the seabed, and during retrieval of the node from the seabed to a recovery vessel. The disclosed attachment mechanism 220 may be moved from an open and/or unlocked position to a closed and/or locked position via autonomous, semi-autonomous, or manual methods. In one embodiment, the components of node lock 220 are made of titanium, stainless steel, aluminum, marine bronze, and/or other substantially inert and non-corrosive materials, including polymer parts.

Autonomous Underwater Vehicle

In one or more embodiments, an autonomous underwater vehicle (AUV) is used to monitor and/or position the deployment of autonomous seismic nodes on the seabed. In general, the structure and operation of a seismic AUV is well known to those of ordinary skill. For example, Applicant's U.S. Pat. No. 9,090,319, incorporated herein by reference, discloses one type of autonomous underwater vehicle for marine seismic surveys.

Figure 3:
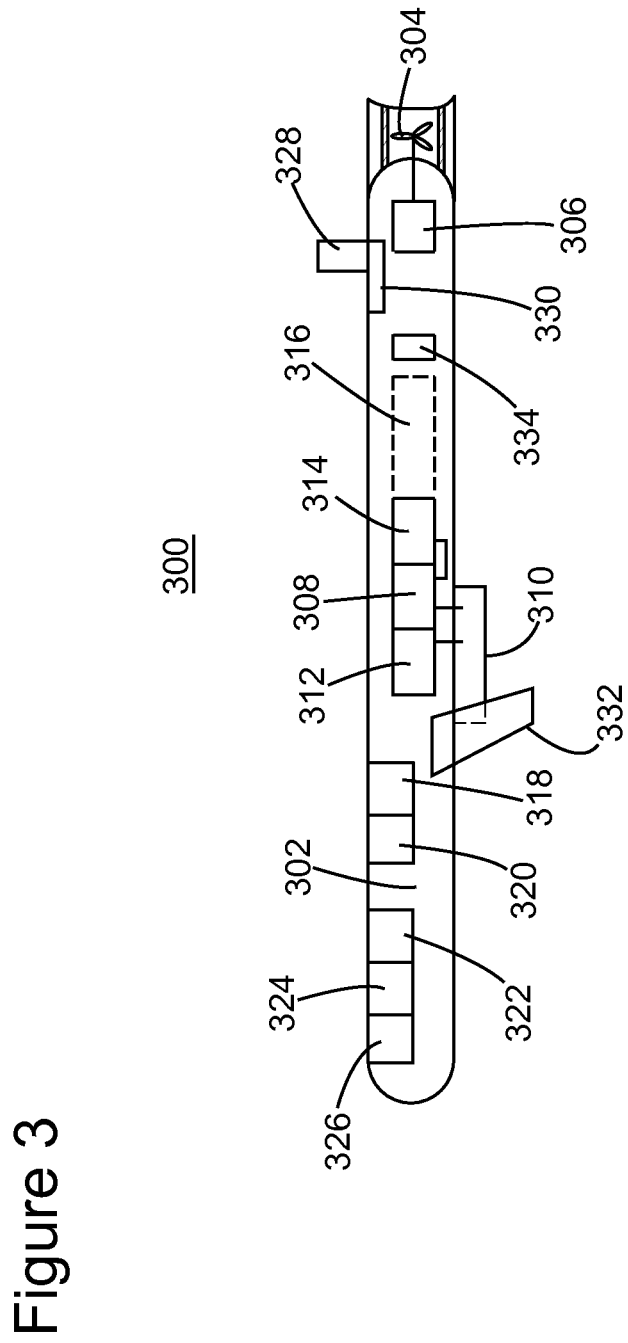
FIG. 3 illustrates one embodiment of a schematic diagram of an AUV.

FIG. 3 illustrates one embodiment of AUV 300. In one embodiment, AUV 300 may comprise a body with a propulsion system, a guidance system, an acoustic system, a navigation system, and a tracking system. The overall shape and design of the AUV is not necessarily important, as long as the AUV is configured to monitor and/or position the deployed autonomous seismic nodes as described herein. For example, the disclosed AUV may or may not have seismic sensors.

In one embodiment, propulsion system may include one or more propellers or thrusters 304. Motor 306 inside body 302 activates propeller 304. Other propulsion systems may be used, e.g., jets, thrusters, pumps, etc. For example, the AUV may include one vertical thruster (for vertical lift) and a plurality of horizontal thrusters (for lateral movement). The AUV may include one or more fins or wings for flight stabilization and/or increased AUV control. Motor 306 may be controlled by processor/controller 308. Processor 308 may also be connected to memory unit 312 and tracking system 310, which may be configured for tracking the deployed cable and/or seismic nodes. Battery 314 may be used to power all these components, and may travel within track or channel 316 for reconfiguration of the AUV's center of gravity.

The AUV may also include an inertial navigation system (INS) 318 configured to guide the AUV to a desired location. An inertial navigation system includes at least one module containing accelerometers, gyroscopes, magnetometers or other motion-sensing devices. The INS is initially provided with the position and velocity of the AUV from another source, for example, a human operator, a global positioning system (GPS) satellite receiver, another INS from a surface vessel, etc., and thereafter, the INS computes its own updated position and velocity by integrating (and optionally filtrating) information received from its motion sensors. The advantage of an INS is that it requires no external references in order to determine its position, orientation, or velocity once it has been initialized. As noted above, alternative systems may be used, as, for example, acoustic positioning systems. An optional acoustic Doppler Velocity Log (DVL) (not shown) can also be employed as part of the AUV, which provides bottom-tracking capabilities for the AUV. Sound waves bouncing off the seabed can be used to determine the velocity vector of the AUV, and combined with a position fix, compass heading, and data from various sensors on the AUV, the position of the AUV can be determined. This assists in the navigation of the AUV and provides confirmation of its position relative to the seabed.

Besides or instead of INS 318, AUV 300 may include compass 320 and other sensors 322 such as, for example, an altimeter for measuring its altitude, a pressure gauge, an interrogator module, a homing beacon, etc. The AUV may optionally include an obstacle avoidance system 324 and a communication device 326 (e.g., Wi-Fi device, a device that uses an acoustic link) or another data transfer device capable of wirelessly transferring data. One or more of these elements may be linked to processor 308. The AUV further includes antenna 328 (which may be flush with the body of the AUV) and corresponding acoustic system 330 for subsea communications, such as communicating with the deploying, shooting, or recovery vessel (or other surface vessel) or an underwater base/station, ROV, or another AUV, or even the deployed nodes themselves. For surface communications (e.g., while the AUV is on a ship), one or more of antenna 328 and communication device 326 may be used to transfer data to and from the AUV. Stabilizing fins and/or wings 332 for guiding the AUV to the desired position may be used together with propeller 304 for steering the AUV. However, in one embodiment, the AUV has no fins or wings. The AUV may include a buoyancy system 334 for controlling the AUV's depth and keeping the AUV steady after landing. In some embodiments, the AUV is neutrally buoyant in a body of water, whereas in other embodiments it may be positively buoyant or negatively buoyant.

Acoustic system 330 may be an Ultra Short Baseline (USBL) system, sometimes known as a Super Short Base Line (SSBL). This system uses a method of underwater acoustic positioning. A complete USBL system includes a transceiver or acoustic positioning system mounted on a pole under a vessel (such as Hi-PAP, commercially available by Kongsberg) and a transponder on the AUV. In general, a hydro-acoustic positioning system consists of both a transmitter (transducer) and a receiver (transponder). An acoustic positioning system uses any combination of communications principles for measurements and calculations, such as SSBL. In one embodiment, the acoustic positioning system transceiver comprises a spherical transducer with hundreds of individual transducer elements. A signal (pulse) is sent from the transducer, and is aimed towards the seabed transponder. This pulse activates the transponder, which responds to the vessel transducer. The transducer detects this return pulse and, with corresponding electronics, calculates an accurate position of the transponder relative to the vessel based on the ranges and bearing measured by the transceiver. In one embodiment, to calculate a subsea position, the USBL system measures the horizontal and vertical angles together with the range to the transponder (located in the AUV in a typical SSBL configuration) to calculate a 3D position projection of the AUV relative the vessel. An error in the angle measurement causes the position error to be a function of the range to the transponder, so an USBL system has an accuracy error increasing with the range. Alternatively, a Short Base Line (SBL) system, an inverted short baseline (iSBL) system, or an inverted USBL (iUSBL) system may be used, the technology of which is known in the art. For example, in an iUSBL system, the transceiver is mounted on or inside the AUV while the transponder/responder is mounted on the surface vessel or ROV and the AUV has knowledge of its individual position rather than relying on such position from a surface vessel (as is the case in a typical USBL system). In another embodiment, a long baseline (LBL) acoustic positioning system may be used. In a LBL system, reference beacons or transponders are mounted on the seabed around a perimeter of a work site as reference points for navigation. The LBL system may use an USBL system to obtain precise locations of these seabed reference points. Thus, in one embodiment, the reference beacon may comprise both an USBL transponder and a LBL transceiver. The LBL system results in very high positioning accuracy and position stability that is independent of water depth, and each AUV can have its position further determined by the LBL system. The acoustic positioning system may also use an acoustic protocol that utilizes wideband Direct Sequence Spread Spectrum (DSSS) signals, which provides for a greater communications range in the water.

Figure 4:
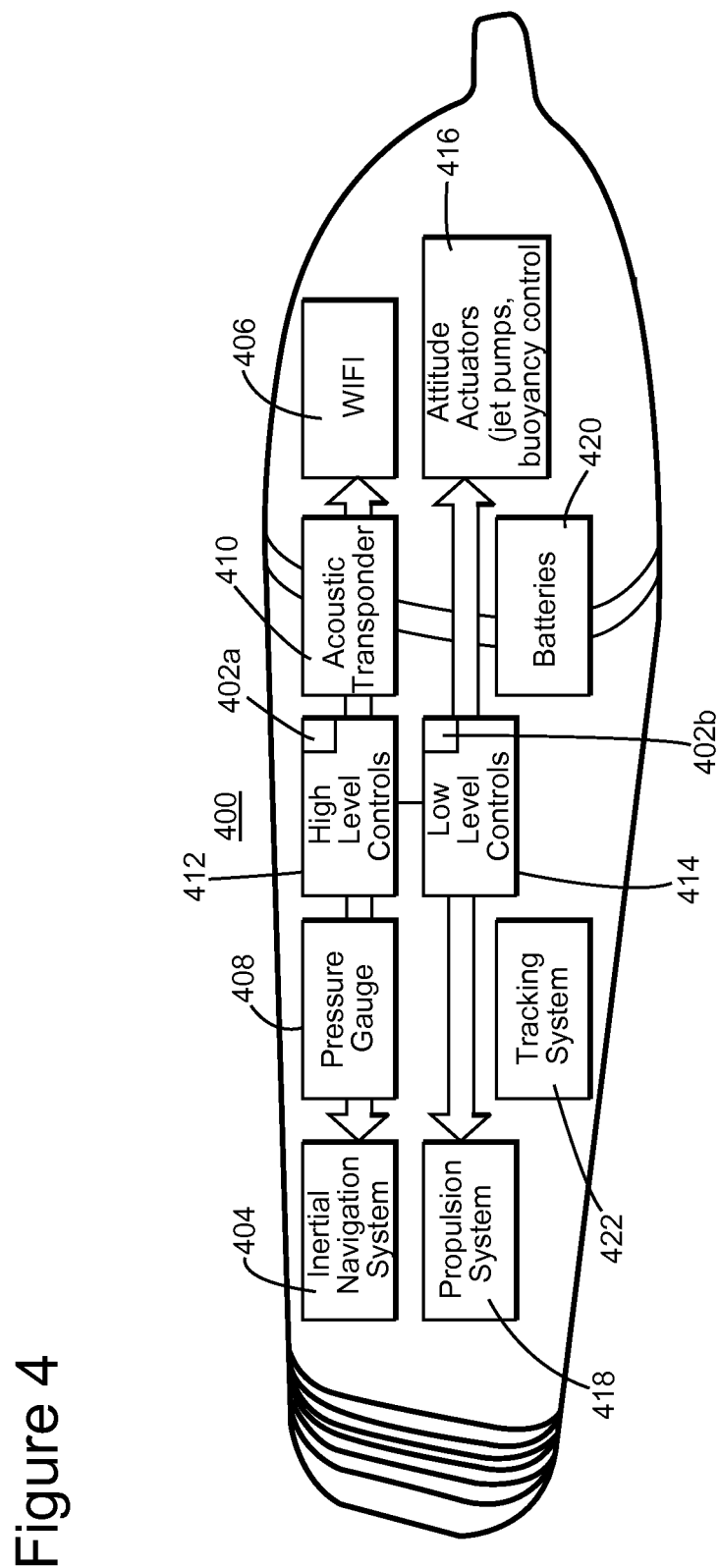
FIG. 4 illustrates another embodiment of a schematic diagram of an AUV.

With regard to the AUV's internal configuration, FIG. 4 schematically shows one embodiment for the arrangement of internal components of AUV 400. AUV 400 comprises CPU 402a that is connected to internal navigation system (INS) 404 (or compass or altitude sensor and acoustic transmitter for receiving acoustic guidance from the mother vessel), wireless interface 406, pressure gauge 408, and acoustic transponder 410. CPU 402a may be located in a high-level control block 412. The INS is advantageous when the AUV's trajectory has been changed, for example, because of an encounter with an unexpected object, e.g., fish, debris, etc., because the INS is capable of taking the AUV to the desired final position as it does for currents, wave motion, etc. Also, the INS may have high precision. For example, an INS may be accurate up to 0.1% of the travelled distance, and a USBL system may be accurate up to 0.06% of the slant range. Thus, it is expected that for a target having a depth of 1000 m, the INS and/or the acoustic guidance is capable of steering the AUV within +/−1 m of the desired target location. However, the INS may be configured to receive data from a surface vessel to increase its accuracy. An optional CPU 402b, in addition to the CPU 402a, is part of a low-level control module 414 configured to control attitude actuators 416 and propulsion system 418. The high-level control block 412 may communicate via a link with the low-level control module 414. One or more batteries 420 may be located in AUV 400. Tracking system 422 may be located inside the AUV for tracking the deployed cable and/or nodes or sensors. As another embodiment, an obstacle avoidance system may be included in the AUV, which is generally configured to detect an object in the path of the AUV and divert the AUV from its original route to avoid contact with the object. In one example, the obstacle avoidance system includes a forward-looking sonar. CPU 402a and 402b may be coupled with one or more internal components to the AUV and provide any necessary control circuitry and software for associated components. Those skilled in the art would appreciate that more or less modules or components may be added to or removed from the AUV based on the particular needs of the AUV.

Remotely Operated Vehicle

While one embodiment utilizes an AUV for the touch-down monitoring, positioning, and/or guiding of a plurality of autonomous seismic nodes, in other embodiments, a remotely operated vehicle (ROV) is used to monitor and/or position the deployment of autonomous seismic nodes. In such an embodiment, the operation of the ROV is substantially similar to that of an AUV, and many of the components for an AUV are applicable in the context of an ROV. However, as opposed to an AUV, a ROV is typically actively steered or operated by an operator from a surface vessel via a wired tether system, while an AUV may be autonomous. In general, the structure and operation of marine ROVs are well known to those of ordinary skill. For example, Publication No. WO 2014/090811, incorporated herein by reference, describes a ROV configured to deploy and retrieve autonomous seismic nodes to the seabed with a separate AUV configured to monitor and exchange data with the seismic nodes. As compared to prior art ROVs, the disclosed ROV may include tracking system 422, navigation system 404, and an acoustic communications system. The ROV may or may not comprise a robotic manipulator arm for general mechanical operations underwater.

Tracking System

Figure 5:
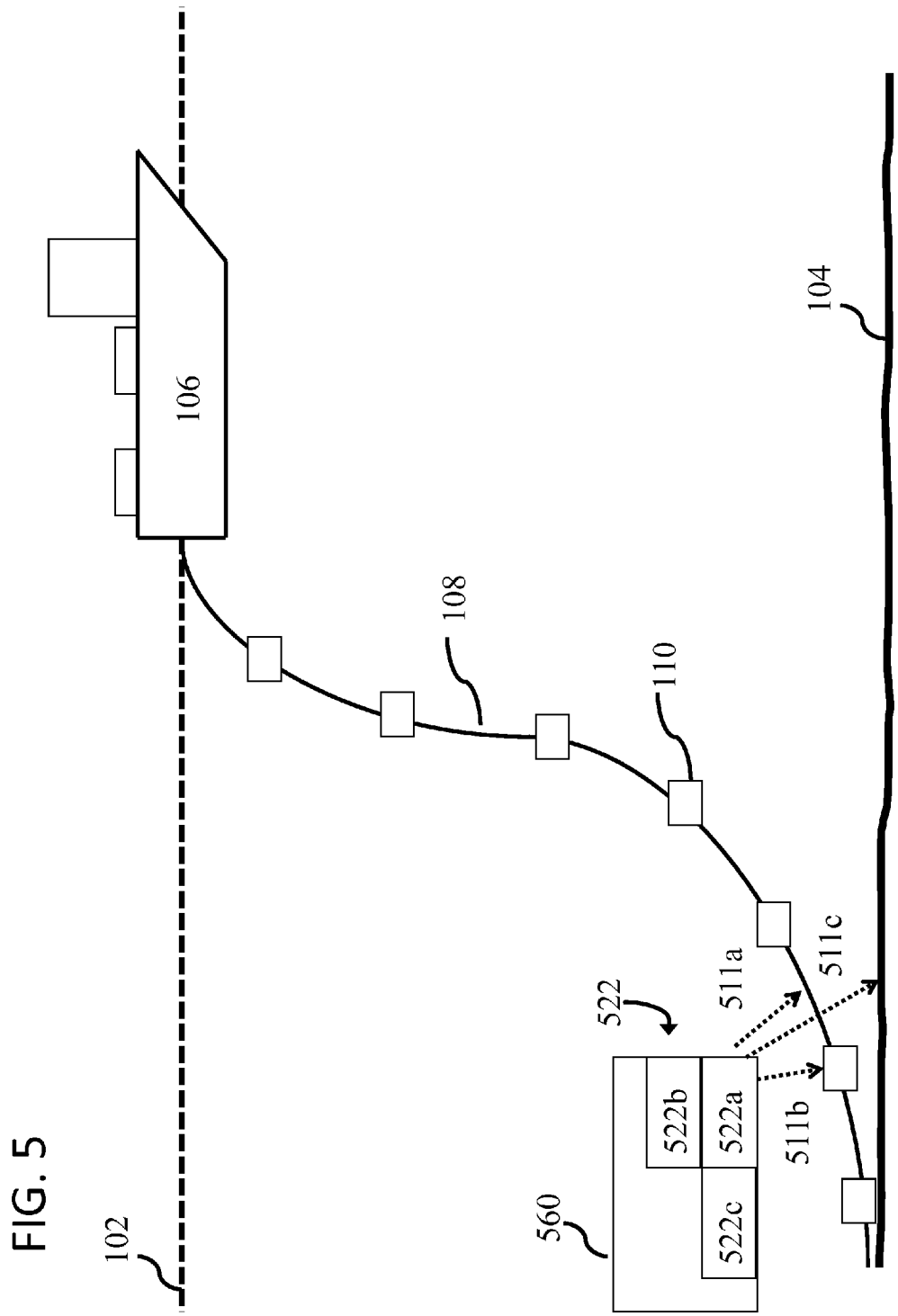
FIG. 5 illustrates one embodiment of a tracking system for an underwater vehicle.

FIG. 5 schematically shows one embodiment for a tracking system 522, which may be substantially similar to tracking system 422 and/or 310. In one embodiment, tracking system 522 can be configured on underwater vehicle 560 (shown in an enlarged view in FIG. 5 for illustrative purposes) for tracking deployed cable 108 and/or nodes 110. Underwater vehicle 560 may be an AUV or an ROV or other similar vehicle. In one embodiment, each tracking sensor or component can be mounted on a custom made frame that is installed to an ROV and, in some instances, an AUV. In other embodiments, each tracking system component is integrated within the body of an underwater vehicle, such as an AUV.

In one embodiment, nodes 110 may be autonomous seismic nodes attached to cable 108, while in other embodiments nodes 110 may be part of an ocean bottom cable system. In one embodiment, a plurality of autonomous seismic nodes 110 are deployed from surface vessel 106 located on water surface 102 to seabed 104, which may be performed via the method and system described in relation to FIGS. 1A and 1B.

In one embodiment, underwater vehicle 560 is an AUV and has a similar structure and operation as that described in connection with AUV 400 and/or AUV 300. In one embodiment, AUV 560 may be a specially designed device that incorporates tracking system 522. In other embodiments, AUV 560 may be an off-the shelf device that may be retrofitted or modified to include tracking system 522 and an appropriate communications system (as described herein). Tracking system 522 may be any of a variety of systems, controls, or mechanisms 522a-c that is configured to track the deployed cable 108 and/or deployed nodes 110. In one embodiment, tracking system 522 interfaces with one or more of the following components on underwater vehicle 560: control module, processor, INS, and communications system. In one embodiment, tracking system 522 is configured to monitor the deployed cable and nodes. In another embodiment, tracking system 522 is configured to position and/or guide the deployed cable and nodes, including guidance based on predictive positioning of the nodes.

In one embodiment, tracking system 522 may use a plurality of tracking mechanisms, such as tracking system module 522a, tracking system module 522b, and tracking system module 522c. For example, tracking system 522a may comprise a cable tracking system, tracking system 522b may comprise a node tracking system, and tracking system 522c may comprise a seabed tracking system. In other embodiments, each tracking system 522a-c comprises a separate tracking system (such as sonar, radar, camera, etc.) that are interrelated to provide the cable, node, and seabed tracking capabilities. In another embodiment, tracking system 522 interfaces with one or more sensors or devices on the underwater vehicle (such as a camera and/or pressure sensor) to provide tracking capabilities to the underwater vehicle. In one embodiment, tracking mechanism 522a utilizes Radio-Frequency Identification (RFID) to identify and track tags attached to deployment cable 108 at specific intervals or to nodes 110. RFID tags can be passive or active, or a combination of battery-assisted passive. Likewise, AUV 560 would be equipped with either an active or passive RFID tag reader. In another embodiment, tracking system 522 may comprise a cable and/or metal tracking sensor (such as a sensor that detects steel) that can track deployed cable 110. In another embodiment, tracking system 522 may comprise an acoustic system that identifies a beacon or transponder or other emitting sensor located at the start of the deployment cable. In another embodiment, tracking system 522 may comprise a sonar system that can use a continuous wave or pulse to identify nodes 110 and/or deployed cable 108. For sonar, a sonic pulse is generated in a particular direction and if there is an object in the path of a transmitted pulse, part or all of the pulse will be reflected back to the transmitter as an echo and can be detected through the receiver path. By measuring the difference in time between the pulse being transmitted and the echo being received, it is possible to determine the distance between the AUV and the deployed cable/node. Various types of sonar technologies can be used, such as side-scan sonar, multi-beam echosound (MBES), or profiling sonars. In a related embodiment, tracking system 522 may comprise an Ultrasound Identification (USID) tagging system, which operates similar to the RFID tag system discussed above but uses ultrasound signals instead of radio-frequency signals. In yet another embodiment, a laser system can be used in short-range tracking applications as a tracking mechanism 522a. In another embodiment, tracking system 522 comprises a plurality of subsea cameras, each of which may be active or passive. The camera system on the AUV can be configured to record video of the deployment cable and deployed nodes for confirmation of proper positioning on the seabed. The camera system can also be configured as part of tracking system 522, in that the cameras are used to visually track and/or monitor the nodes and/or deployment cable. In another embodiment, tracking system 522 may comprise a combination of tracking systems, such as sonar system 522b to identify nodes 110 and cable tracking system 522a to follow cable 108 between nodes 110. In one embodiment, tracking system 522 comprises a plurality of tracking sensors, devices, and/or systems configured to track the cable between each of the plurality of nodes and/or the position of each of the nodes on the cable.

FIG. 5 illustrates one embodiment of how tracking system 522 may operate. In one embodiment, tracking system 522 is configured to determine the distance (511a) to a portion of the cable 108, the distance (511b) to a first node 110a, and the distance (511c) to the seabed 104. For example, tracking system 522 is configured to determine distance 511a to the cable by cable tracking sensor 522a, which allows the AUV to automatically follow the metallic cable. Tracking system 522 is also configured to determine distance 511b to (and position of) node 551 by using another portion of the tracking system, such as camera system 522b. Tracking system 522 is also configured to determine distance 511c to (and position of) the seabed by using another portion of the tracking system, such as sonar system 522c. In other embodiments, the AUV may be configured with a pressure sensor to determine the depth of the AUV (e.g., the distance from the node to the water surface), which can be used to provide an accurate depth for node 110. In other embodiments, tracking system 522 may be configured with a MBES and/or DVL system for seabed tracking and positioning capabilities to differentiate the position of node 110 from seabed 104 and to confirm that touchdown or contact between seabed 104 and node 110 occurred effectively and to determine the height of the node from the seabed. Each component or sub-system of tracking system 522 may be located on or coupled to an exterior portion of underwater vehicle 560 as appropriate based on the specific requirements of the tracking system, as may be known in the relevant arts. For example, sonar system 522c may be located on a lower portion of the AUV and camera system 522b and cable tracking system 522a may be located on a front portion of the AUV. In other embodiments, only a node tracking system is utilized (e.g., the cable is not specifically tracked between the nodes). In still other embodiments, a seabed tracking system is not utilized, and only the cable and each node is actively tracked by the tracking system.

In still other embodiments, a unique ID number is associated with each node 110 for identification by the tracking system of underwater vehicle 560. The unique ID number may be utilized to identify specific positions of particular nodes and to correlate those positions against subsequent seismic data collections by the node array. Thus, in one embodiment, tracking system 522 is configured to both track and identify specific nodes 110 and confirm their positions as well as track and follow deployment cable 108 between individual nodes 110. In one embodiment, a visual ID number is fitted on a portion of the node (such as on the top of the node's body) to allow for the node's identification by a camera system of the underwater vehicle. The unique ID number can be made in a specific, reflective material that is enhanced for camera detection in subsea conditions. In other embodiments, an RFID tag (which may be passive or active) is implanted on each node 110 and can be read by an equivalent RFID reader on the underwater vehicle. In one embodiment, a visual ID marker or tag is used and an RFID tag is used as a backup. In some instances, mud or debris may reside on the node after touchdown that prevents or impairs the ability of the underwater vehicle to visually detect the node's ID. Thus, in some embodiments, underwater vehicle 560 is configured with a nozzle or jet that sprays water onto the node to remove any such debris before a visual ID of the node can take place.

Figure 6:
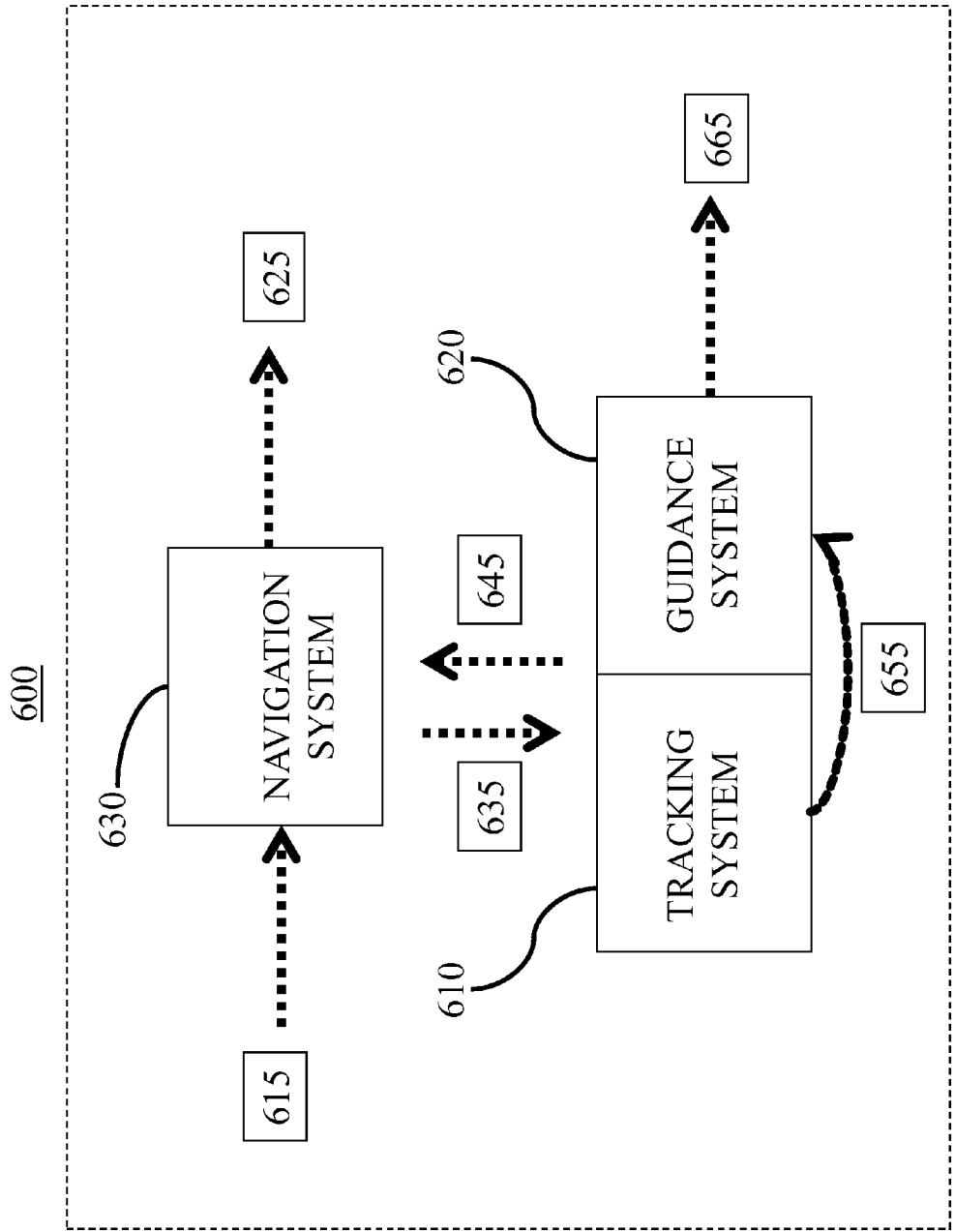
FIG. 6 illustrates one embodiment of a schematic diagram of a node monitoring system.

FIG. 6 illustrates a schematic of one embodiment of deployment monitoring system 600. In one embodiment, deployment monitoring system 600 comprises tracking system 610, guidance system 620, and navigation system 630. Tracking system 610 (which may be substantially similar to tracking system 522) is configured to monitor and/or track the deployed cable and/or attached nodes, and may comprise one or more tracking modules or components or sensors, such as a camera system, a sonar system, and a cable tracking system, among others. Guidance system 620 interfaces with and/or is coupled to tracking system 610 to position and/or guide the deployed cable and nodes based on communications with a surface vessel, including guidance based on predictive positioning of the nodes. Thus, in one embodiment, tracking system 610 locates the nodes and/or cable and identifies relevant positions of the nodes and/or cable, while guidance system 620 is configured to position and guide the nodes and/or deployed cable on the seabed based upon the positions obtained by the tracking system. In one embodiment, data 655 from tracking system 610 is provided to guidance system 620. In one embodiment, tracking system 610 and/or guidance system 620 is configured to output node position message 655 (which may be textual, visual, and/or audio) that may comprise one or more of the following node monitoring parameters for each node: ID, position, depth, and height. In other embodiments, tracking system 610 and/or guidance system 620 may be configured to output a flag or other indicia to indicate a successful touchdown of a node. In one embodiment, guidance system 620 outputs vessel command data 665 to a surface vessel to position, modify, or optimize the cable deployment based upon the desired guiding and/or positioning of the cable/nodes in response to the measured node and cable positions determined by tracking system 610. Guidance system 620 (or portions thereof) may be located on the underwater vehicle or may reside on a vessel other than the underwater vehicle, such as a surface vessel. Thus, in one embodiment, tracking system 610 is located on an AUV or ROV and configured to output node position data 655 to guidance system 620 located on a surface vessel.

In one embodiment, tracking system 610 and/or guidance system 620 interfaces with and/or is coupled to navigation system 630. Navigation system 630 may be any standard navigation system on an AUV that is configured to provide or output a real-time or near real-time position 625 of the AUV while subsea. It preferably comprises (or may receive input from) a USBL, INS, or DVL system 615 on the AUV. In one embodiment, navigation system 630 receives input 645 from tracking system 610 and/or guidance system 620 (such as steering positions/requirements to follow the deployed cable and/or nodes) and provides output 635 to tracking system 610 and/or guidance system 620 (such as the ROV's altitude and position).

In one embodiment, guidance system 620 provides the capability to position and/or guide the deployed cable and nodes in response to the positions of the cable and nodes and/or the touchdown positions of the nodes. In one embodiment, the guidance system may be configured to position, modify, and/or optimize the deployment position of the cable from the surface vessel based on the touchdown positions of one or more of the plurality of seismic nodes. In another embodiment, the guidance system may be configured to position, modify, and/or optimize the deployment position of the deployment cable from the surface vessel based on one or more predicted touchdown positions of the plurality of seismic nodes. In another embodiment, the guidance system may be configured to position, modify, and/or optimize the deployment position of the cable from the surface vessel based on a difference between the actual touchdown position of a node and a predetermined seabed position of the node. As an example, guidance system 620 or tracking system 610 may comprise automatic picture detection software that can automatically identify and track the cable and its nodes. In some embodiments, the guidance system 620 may further include a photogrammetry application or system, which makes measurements from imagery analysis that can be used to recover the position of various designated reference points on a moving or still object. In other embodiments, image analysis results are combined with measurements from other sensory systems of tracking system 610 to provide more data for the photogrammetric calculations and are used in computational models to successively estimate the actual 3D relative motions within a field. In some embodiments, guidance system 620 may employ high-speed imaging and remote sensing in order to detect, measure, and record complex 3D motion fields. Thus, guidance system 620 may communicate to a surface vessel various commands (such as data commands 665) to optimize or modify the cable deployment based upon the intended positioning of the cable/nodes, such as turn to starboard, turn to port, increase vehicle speed, decrease vehicle speed, increase winch speed, decrease winch speed, etc. The guidance system may also be configured to vary the deployment cable and/or the node position on the seabed based upon the touchdown position of one or more of the plurality of nodes, the predicted touchdown position of one or more of the plurality of nodes, and/or the difference between the actual touchdown position of a node and a predetermined seabed position of the node.

Monitoring and Positioning of Nodes

As discussed above, acoustic positioning transponders attached to the deployed cable or rope have traditionally been used to determine the positions of the cable/sensors during and after deployment. A need exists for an improved method and system for monitoring cable deployed with nodes on the seabed (whether for ocean bottom cable or autonomous seismic nodes attached to a deployment cable), and in particular one that eliminates all or substantially all of the transponders typically used in such applications. A need further exists to confirm a node's touchdown or contact with the seabed for proper positioning and recoding of seismic signals. In one embodiment, an AUV or ROV is used to monitor and/or position the deployment of a plurality of autonomous seismic nodes that are deployed from a marine vessel. In another embodiment, an AUV or ROV is used to monitor and/or position the deployment of an ocean bottom cable. This system is much more cost effective than transponders and allows better positioning and accuracy of deployed nodes. Further, an underwater vehicle can be used not just to monitor or to verify the positions of the deployed nodes or cable, but also to guide or position the cable and nodes as the deployment cable is being deployed. Alternatively, while many of the embodiments are directed to an AUV, a remotely operated vehicle (ROV), such as one commercially available from Saab Seaeye, can also be used for monitoring and/or positioning of the nodes and deployment cable and any commercially available ROV may be modified consistent with the scope of the disclosure (such as providing the necessary tracking system and communications system capabilities) and used in a manner similar to that described herein for an AUV. The systems described in FIGS. 7-10 operate substantially similar in regards to the tracking system and/or guidance system of the underwater vehicle and are applicable whether the underwater vehicle is an AUV or ROV.

Figure 7:
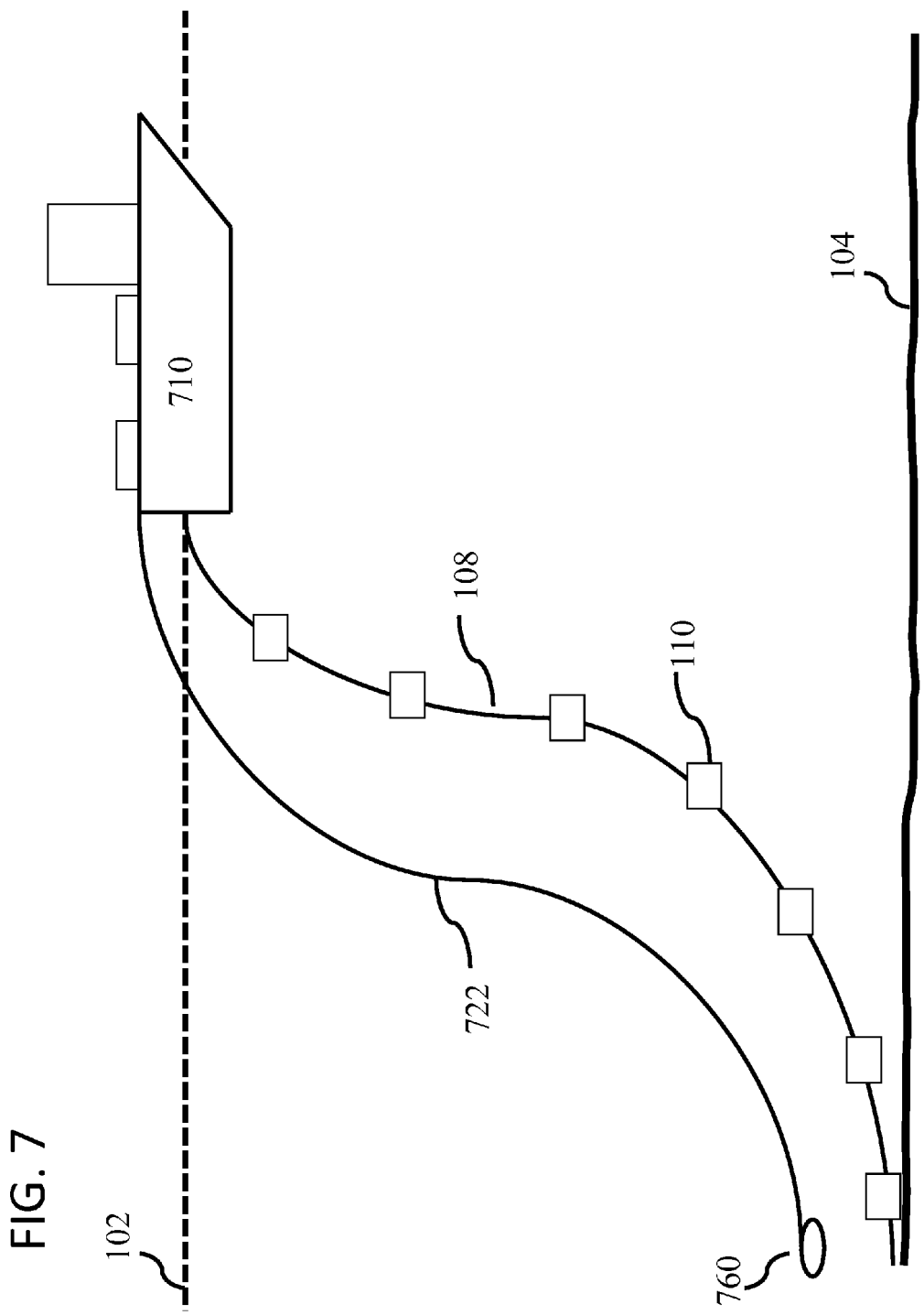
FIG. 7 illustrates one embodiment of a node monitoring system.

FIG. 7 illustrates one system for using an AUV to monitor and/or position the deployment of seismic nodes on or near seabed 104. In one embodiment, deployment vessel 710 launches deployment line 108 from surface 102 with autonomous seismic nodes 110 attached to line 108. Alternatively, an ocean bottom cable can be deployed instead of autonomous nodes. In one embodiment, AUV 760 has been deployed into the sea prior to deploying deployment line 108. AUV 760 may know the approximate initial deployment location for the deployed nodes and may find its desired position using, for example, an inertial navigation system (INS). The AUV may be preprogrammed or partially programmed to find its desired position. If AUV 760 is partially programmed with the coordinates of its desired position, the final details for finding the desired position may be sent from vessel 710 after AUV 760 is launched from the vessel. If the AUV is fully preprogrammed with the coordinates of its desired position, the destination coordinates may be preprogrammed into AUV 760 prior to its launch from vessel 710. In other embodiments, AUV 760 is launched from a surface vessel near the time deployment line 108 is launched so that AUV 760 can monitor the deployment of deployment line 108 as it approaches the seabed. While AUV 760 can be deployed by vessel 710, other vessels (such as shooting vessels or unmanned surface vessels) can also deploy AUV 760 substantially before, near, or after the time of the deployment of deployment cable 108.

The system described in FIG. 7 uses a wire or tethered communication system 722 from AUV 760 to vessel 710. In this embodiment, wire 722 connects a responder (or other communications system) on the AUV to vessel 710. In some embodiments, use of a neutrally buoyant tether or tether management system (TMS) can also be utilized, which is particularly helpful in deep-water applications. The use of a wire connected to the AUV provides a much faster and more reliable data transfer than acoustic communications, and may result in an increased speed of data transfer from AUV 760. This improved data transfer rate allows for more reliable, efficient, and real-time placement of the deployment line than reliance on wireless communications. In some embodiments, wire 722 can also provide power to AUV 760, which allows the AUV to stay on the bottom of the ocean for longer periods of time without the need for battery replacement.

In one embodiment, a signal from vessel 710 is sent to AUV 760 when the deployment line is deployed to turn on a tracking system of AUV 760 and to provide initial coordinates of the vessel and expected launch and/or deployment positions of the deployed nodes. Preferably, AUV 760 moves to the expected position of the deployment line when it approaches the seabed. In one embodiment, the starting point or end of the deployment line may have a beacon, tag, or transponder that emits a signal that can be detected by the AUV to help initially position AUV 760 proximate to the deployment line. Once AUV 760 approaches the deployment line, AUV 760 begins tracking deployment line 108 by a tracking system, as discussed above.

As AUV 760 tracks the deployment line and the deployment of the nodes, in one embodiment it is in constant communication with deployment vessel 710 and real time or near real time data is exchanged between AUV 760 and vessel 710. Preferably, AUV 760 tracks and records the touchdown location of each node on the seabed. In addition, AUV 760 may also track the deployment line between the intervals of the autonomous nodes, which may be 25 meters or more depending on the survey requirements, by using one or more components of the AUV tracking system (such as tracking system 522 or 610). With real-time (or near real-time) information on the location of the deployed nodes and deployment line, deployment vessel 710 can vary the deployment route of the deployment line for better positioning of the nodes. Thus, the present disclosure provides much better accuracy to the positioning of nodes on the seabed than previously possible (including by the use of transponders). Further, the presently disclosed AUV not only monitors the positions of the nodes but also facilitates and/or guides the positioning of the nodes based on communication with the deployment vessel. Still further, a guidance system (whether it is located on AUV 760 or vessel 710) may be configured to predict the touchdown position of the nodes being deployed. Such a guidance system may be substantially similar to guidance system 620. If the predicted touchdown position for a node is too far away from where a node (or a plurality of nodes) is supposed to be based on the survey requirements and planned coordinates/pre-plot position, then the deployment vessel can act on this estimated difference and vary certain parameters (such as vessel position and speed) to minimize the difference between the actual touchdown position and the planned node positions. In one embodiment, such a guidance and/or control system is located on vessel 710, and in other embodiments the guidance and/or control system is located on AUV 760 and may be part of or integrated with a tracking system on AUV 760.

In another embodiment the AUV sends and receives data at various time intervals with deployment vessel 710 or another vessel. In still another embodiment AUV 760 saves all of the recorded data on the deployed node locations and transfers the data to a vessel or station at a later time, which may not be helpful for real-time guidance of the deployment line but can be used for processing of the seismic data recorded by the nodes. In other embodiments, an ocean bottom cable (not shown) with integrated sensors/nodes can be deployed from the vessel 710 and monitored by AUV 760 in a similar manner as described above for autonomous nodes. In still another embodiment, AUV 760 uses wire 722 to communicate with vessel 710 for data transfer and uses an acoustic system to communicate with vessel 710 to verify the position of AUV 760.

Figure 8:
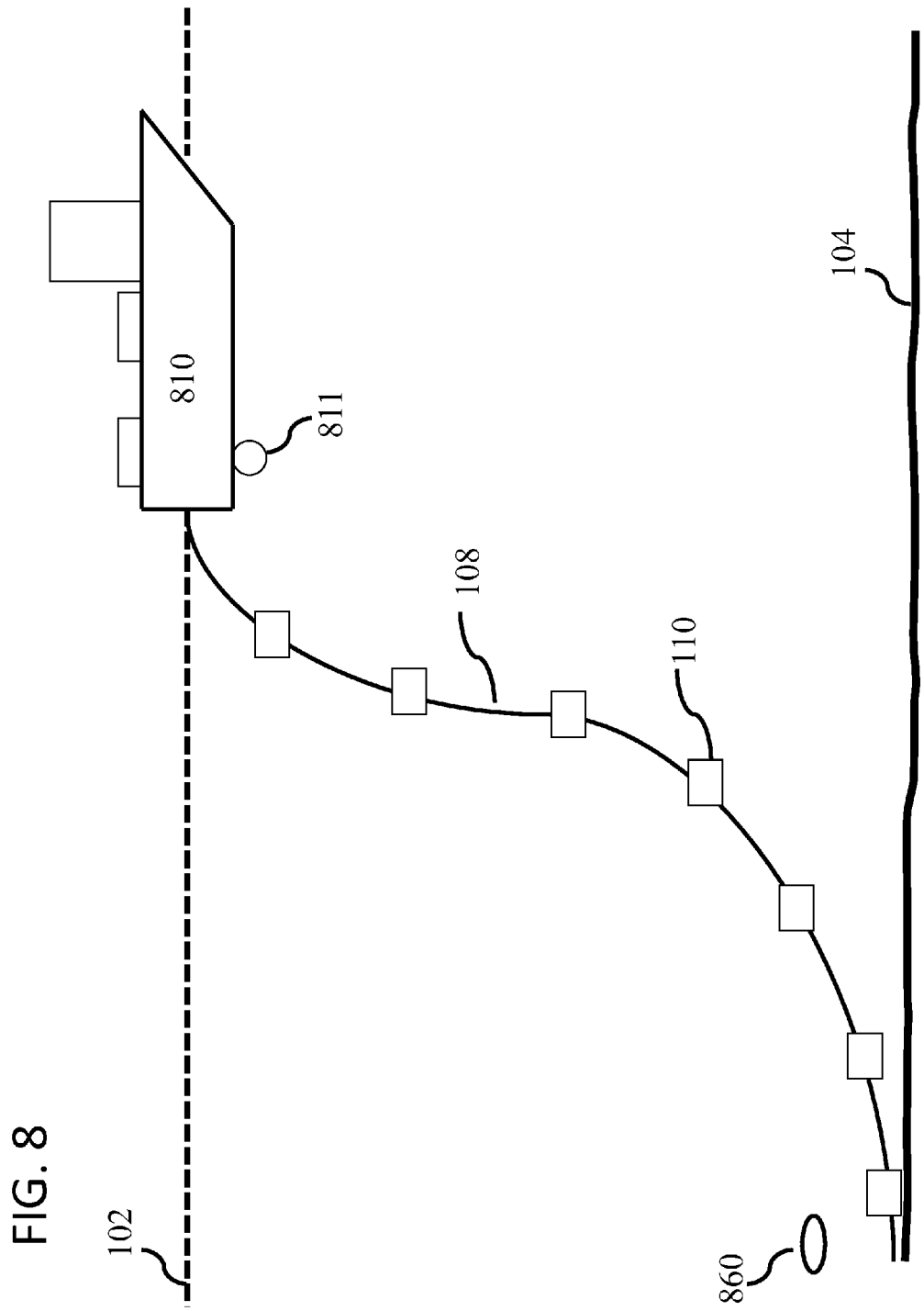
FIG. 8 illustrates another embodiment of a node monitoring system.

FIG. 8 illustrates another system for using an AUV to monitor and/or position the deployment of nodes on or near the seabed. This system is similar to the system described in FIG. 7, but AUV 860 is not connected to surface vessel 810 by a wire. Instead, vessel 810 communicates with AUV 860 by using a wireless transmission system. Because AUV 860 is equipped with a transponder or other acoustic communications system, it is able to communicate with acoustic positioning system 811 on vessel 810 to verify its position. In some embodiments, surface vessel 810 communicates to AUV 760 an initial position proximate to the intended location of the start of deployment cable 108, at which point the tracking system on AUV 860 then begins to track deployment line 108. While the use of acoustic communications is not as fast as the wire communications described in connection with FIG. 7, it avoids any unnecessary tangles between wire 722 and deployment cable 108.

Data communications to and from the AUV may or may not be provided through acoustic positioning system 811. In one embodiment, AUV 860 may be configured to communicate with vessel 810 by using acoustic communications as well as a wire system. In other embodiments, separate acoustic communication systems for data transfer is utilized on the AUV and surface vessel. For example, AUV 860 may utilize a positioning link and a telemetry link. The positioning link or system may be a USBL system that interfaces with an acoustic positioning system of surface vessel 810 to confirm or provide the position of AUV 860 relative to the vessel. The telemetry link may be an acoustic modem or other acoustic communications system that is configured to provide data transfer to and from AUV 860 and a corresponding communications system on surface vessel 810. For example, any information provided by the guidance system and/or tracking system of the AUV may be sent via the telemetry link.

Figure 9:
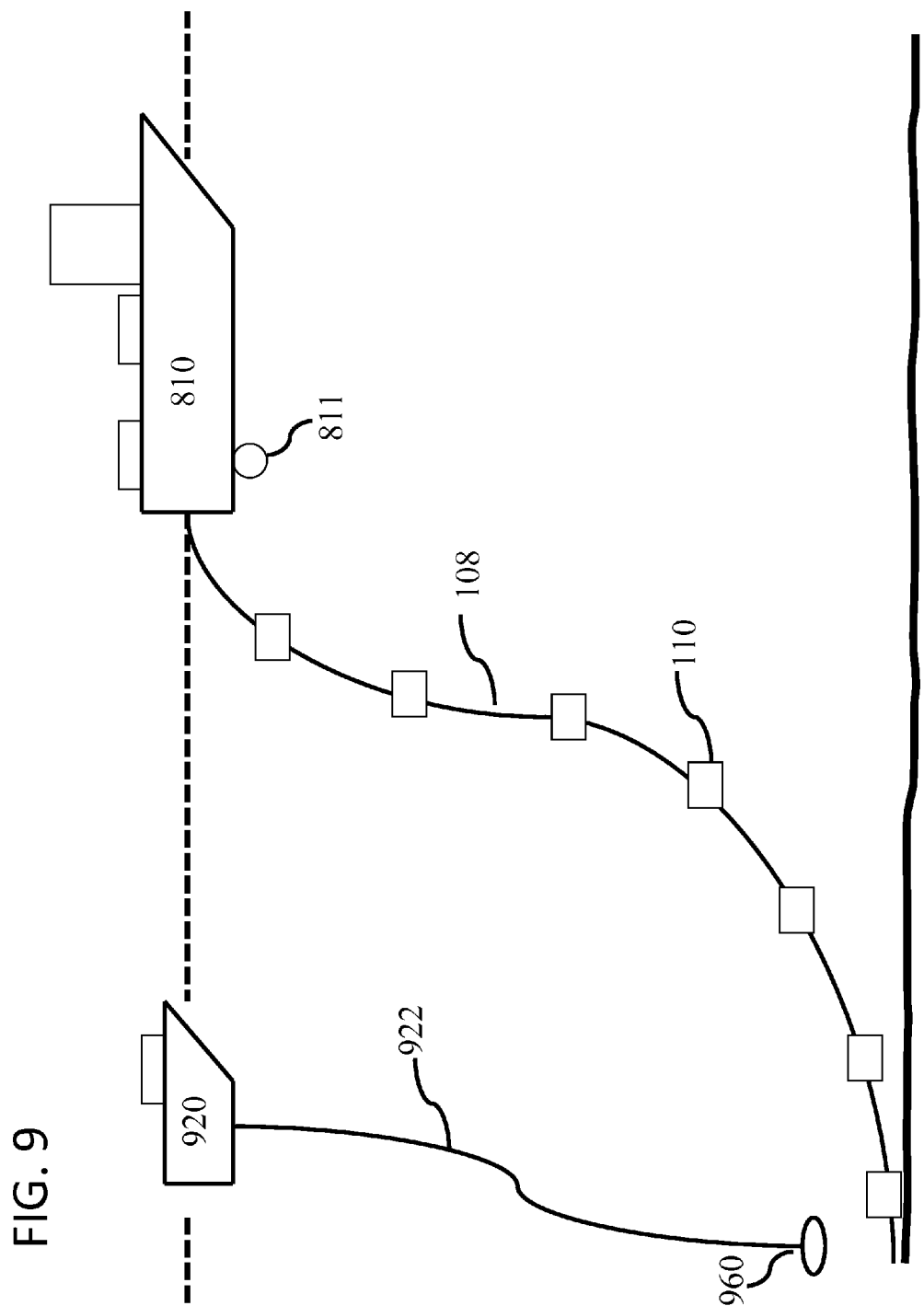
FIG. 9 illustrates another embodiment of a node monitoring system.

FIG. 9 illustrates another system for using an AUV to monitor and/or position the deployment of nodes on or near the seabed. This system is similar to the system described in FIG. 7, but utilizes second vessel 920 (which may be an unmanned surface vessel, USV) to communicate with AUV 960. In one embodiment, AUV 960 is deployed from USV 920. The use of a second vessel provides additional operational capabilities to AUV 960, such as increased range and less potential for wire 922 to be tanged with deployment cable 108. Likewise, USV 920 can deploy AUV 960 prior to and separate from the deployment of deployment cable 108 and AUV 960 is thus not contingent upon the status of vessel 810. In one embodiment, USV 920 and vessel 810 are configured to communicate with each other, such that communications from AUV 960 are first received from USV 920 and then provided to vessel 810. In this manner, deployment vessel 810 can still position and/or guide deployment cable 108 based on measurements and/or guidance provided by AUV 960. In other embodiments, AUV 960 may be configured to also communicate with acoustic positioning system 811 of vessel 810 by using acoustic communications in addition to communications with vessel 920 by wire system 922. The interface with acoustic positioning system 811 provides a separate mechanism to verify the position of the AUV 960 rather than relying solely on the AUV's own internal navigation system.

Figure 10:
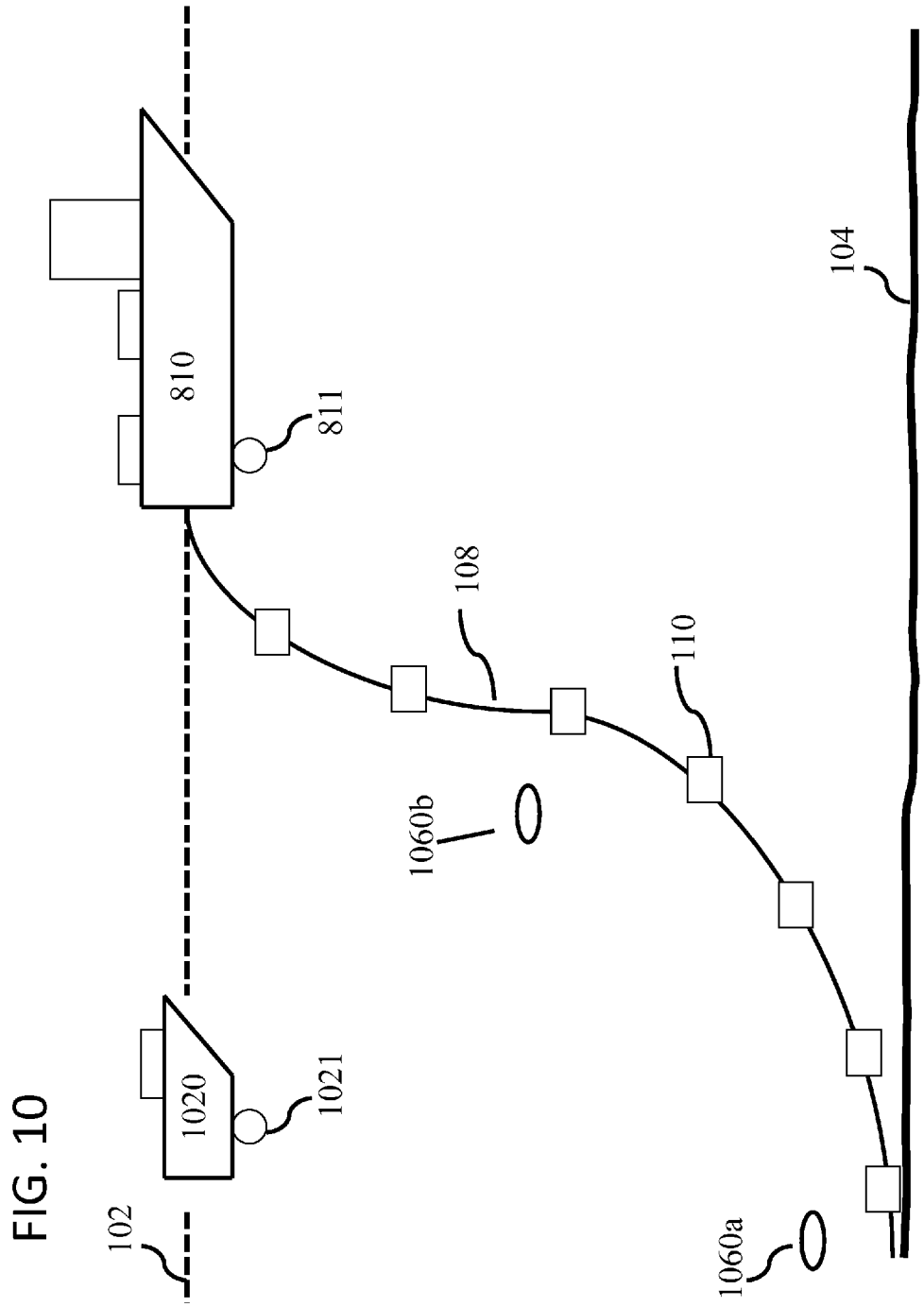
FIG. 10 illustrates another embodiment of a node monitoring system.

FIG. 10 illustrates another system for using an AUV to monitor and/or position the deployment of nodes on or near the seabed. This system uses second vessel 1020 similar to the system described in FIG. 9, but utilizes wireless communications (such as acoustic communications) between AUV 1060 and surface vessel 1020. Because USV 1020 can be positioned closer to AUV 1060 than deployment vessel 810, USV 1020 may provide faster and better wireless communications with AUV 1060. Another embodiment uses both deployment vessel 810 and USV 1020 to communicate with AUV 1060. The use of two transducers or acoustic positioning systems that communicate with AUV 1060 from the different vessels (as opposed to one) increases the electrical and acoustic redundancy of the communications based on two independent measurements. The dual system uses both transducers from the vessels to measure the position of one single target transponder (located on the AUV) by separately controlling the beam forming and phase measurement for each system in parallel. This provides greater accuracy of the position of AUV 1060 and provides better data and accuracy on the location of deployment line 108 and deployed nodes 110.

In another embodiment, as described in FIG. 10, the system uses a plurality of AUVs 1060a, 1060b for more effective positioning and/or monitoring of deployment cable 108 as opposed to just one AUV. For example, first AUV 1060a may be utilized near the seabed, while second AUV 1060b may be utilized in the body of water (such as approximately halfway) between the seabed and the sea surface. In this embodiment, first AUV 1060a can be used to monitor and/or position the cable and nodes at the seabed (and to verify the touchdown position of each node) and second AUV 1060b can be used to monitor the deployment of the cable somewhere between the seabed and the surface vessel. Thus, the use of second AUV 1060b may provide more effective positioning of the deployment line. In addition, second AUV 1060b can be used as a communications relay to more quickly and accurately send communications from a surface vessel to first AUV 1060a. Further, in still another variation, second AUV 1060b can be connected via wire to the surface vessel to provide still faster communications to the plurality of AUVs. In still another embodiment, second AUV 1060b can act as an additional acoustic positioning system to provide greater accuracy of the position of first AUV 1060a. In another embodiment, a plurality of USVs may be used to communicate with an AUV to provide still better accuracy regarding the location of AUV 1060. In other embodiments, one or more surface buoys or stations may be used in addition to or as a replacement of USV 1020 for communication with AUV 1060. In one embodiment, AUV 1060 may be deployed or launched by either USV 1020 or deployment vessel 810.

FIG. 11 illustrates one embodiment of a method for monitoring the deployment of a cable attached to a plurality of marine seismic nodes by an underwater vehicle. In an embodiment, method 1100 includes positioning at least one AUV in a body of water, such as on or near the seabed, as shown in block 1102. In some embodiments multiple AUVs may be deployed, such that one AUV is deployed near the seabed and another AUV is deployed in the middle vertical section of the body of water. The method further includes providing at least one surface vessel to communicate with the at least one AUV, as shown in block 1104. The surface vessel can be a deployment vessel, a shooting vessel, an unmanned surface vessel (USV), or other surface vessels or stations. The communication may be through acoustic wireless means or through a wired system. In some embodiments, multiple vessels are configured to communicate with the AUV. The method further includes positioning the at least one AUV proximate to a deployed cable, as shown in block 1106. The cable can be an ocean bottom cable with integrated sensors or a cable/rope with coupled autonomous seismic nodes. In one embodiment, the AUV is provided on or near the seabed prior to the deployment of the deployment cable with nodes. In other embodiments, the AUV is launched at a time near the launching of the deployed cable. Thus, the providing of an AUV is not necessary prior to the deployment of the cable. In one embodiment, a surface vessel provides coordinates to the at least one AUV to facilitate the AUV in initially identifying the start (e.g., first end) of the deployed cable. If multiple AUVs are used, a second AUV may be positioned higher up in the sea so as to monitor the end of the deployment cable as it drops from the surface vessel to the seabed. The method further comprises monitoring the deployment of the deployed cable by the at least one AUV, as shown in block 1108. In some embodiments, the AUV monitors the individual nodes in addition to or in lieu of the cable itself. Preferably, the AUV monitors the deployed cable by a tracking system on the AUV (such as tracking system 522), which may take many forms and may in some embodiments comprise multiple tracking systems.

Method 1100 further comprises communicating the position of the cable (or specific positions thereof) to at least one surface vessel, as shown in block 1110. Such communications may also include one or more positions of each of the plurality of nodes. In some embodiments, the communication includes a data message on the position of the node, including the node's ID, depth, height, and position. While this communication may be done acoustically, other forms of communication, such as wireless or even via a tethered wire system, are possible. These communications may be done real time or near real time in conjunction with determining the position of the cable or node. Similarly, the AUV can communicate to multiple surface vessels at a time to provide increased data reliability and accuracy. The method further comprises, based on the received positions of the cable and/or nodes as monitored by the AUV, positioning the route of the deployment cable to optimize the survey pattern, as shown in block 1112. In one embodiment, the positioning step comprises guiding and/or controlling the deployment of nodes and deployment cable based on one or more predictions of a touchdown position of at least one node. For example, if the predicted touchdown position for a node is too far away from where a node is supposed to be based on the survey requirements and planned coordinates, then the deployment vessel can act on this estimated difference and vary certain parameters (such as vessel position and speed) to minimize the difference between the actual touchdown position and the planned node positions. In one embodiment, the guiding and/or controlling system utilizes a sonar system to track the cable and attached nodes as well as to position/guide the deployment of such nodes with great accuracy. Of course, one or more of these steps can be performed in various orders or may not be necessary in all situations. For example, a surface vessel may be provided prior to providing an AUV near the seabed, and the AUV may be used to just monitor the deployment of the deployed cable and confirm proper node touchdown but not necessarily guide or change the vessel's route of deployment based on the positions of the deployed cable as measured by the AUV. Likewise, instead of using an AUV, a ROV or other underwater vehicle can be utilized in substantially the same operation as that described above for an AUV.

Once the deployment line has been fully deployed and the nodes are in position, a signal may be sent to the AUV to turn off or make inactive the tracking system to conserve power. In one embodiment, a shooting vessel, a deployment vessel, or another vessel or station may instruct the AUV to resurface and may be configured to guide the AUV to a desired recovery position of the AUV and/or nodes. If future node deployments are expected in the vicinity of the AUV, the AUV may be allowed to stay near the seabed. If the battery on the AUV is low or if no future deployments are expected, a signal can be sent to AUV to return to the surface for recovery by a surface vessel.

FIG. 12 illustrates one embodiment of providing a node position and/or node touchdown confirmation by the use of an underwater vehicle, such as an AUV or ROV. In an embodiment, method 1200 includes positioning an AUV proximate to a deployment that is deployed subsea and attached to a plurality of seismic nodes, as shown in block 1202. The seismic nodes may be autonomous seismic node or seismic sensors integrated into an ocean bottom cable. In one embodiment, a surface vessel provides coordinates to the AUV as to the intended position of the deployment cable and/or nodes. The AUV may include a tracking system configured to identify and track the deployed nodes and/or a cable that is attached to the nodes. The AUV can be provided by a vessel that deploys the deployment cable (with attached nodes) or a second surface vessel. Further, the AUV can be configured to communicate with one or more surface vessels via either (or both) wire or acoustic communications. The method further includes identifying and/or determining the position of a first node, as shown in block 1204. In one embodiment, the AUV flies above the deployment cable at a given depth or a given height until it locates the first node. In one embodiment, the AUV uses a tracking system (such as tracking system 522) to identify and/or locate the position of the first node, such as a sonar system or a metal cable-tracking sensor. Once the first node has been located, the AUV is positioned proximate the first node in a close proximity. In one embodiment, an echo sounder system may monitor the depth difference between the seafloor and the node. The method further includes recording the position of the first node, as shown in block 1206. In one embodiment, a unique ID on the node is obtained and recorded for identification purposes. In one embodiment, once the node contacts the seabed (such that the difference between the depth of the node and the seafloor is approximately "0"), a picture can be automatically taken of the node and other data (location, depth, time, etc.) can be recorded and associated with the unique ID of the node. In one embodiment, the node position data is sent to a surface vessel, as shown in block 1208. This step may or may not include sending the node position data to additional surface vessels, a second AUV, an ROV, or other subsea station. The method further includes positioning the AUV proximate to another node attached to the deployed cable, as shown in block 1210. In one embodiment, the AUV is configured to track and follow the deployed cable that attaches the plurality of nodes. In one embodiment, the AUV detects a first node and then tracks the cable until a second or adjacent node is detected. The method further includes determining, recording, and communicating the positions of the second deployed node, as described in connection with blocks 1204, 1206, and 1208. This process can be repeated until the desired number of nodes are identified and positioned. In one embodiment (not shown), the method further comprises guiding and/or controlling the deployment of nodes and deployment cable based node position data provided to a surface vessel. Such data may include one or more predictions of a touchdown position of at least one node. The guidance of the deployment cable may be done in real time or near real time in relation to the position monitoring of each deployed node.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the configurations of a node and the wireless systems on the node and/or vessel are within the scope of the invention. For example, the underwater vehicle may be of any shape or configuration, and may be designed to track the deployment cable, track each of the plurality of nodes, and/or both. In one embodiment, multiple underwater vehicles may be used to monitor the cable deployment, and multiple surface vessels may be used to communicate with the one or more underwater vehicles. While an AUV is the embodiment discussed most in this disclosure, other underwater vehicles may be used for touchdown monitoring and/or positioning and guiding of the cable and nodes, such as an ROV. Further, the disclosure is applicable for autonomous seismic nodes attached to a deployment cable or ocean bottom cable integrated with seismic nodes. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A system for the deployment of seismic nodes on or near the seabed, comprising
    a plurality of seismic nodes coupled to a cable and configured to be deployed into a body of water from the back deck of a surface vessel; and
    at least one underwater vehicle, wherein the underwater vehicle comprises
        a propulsion system configured to steer and propel the vehicle in a body of water;

an automatic tracking system configured to track the deployment position of each of the plurality of seismic nodes; and a communications system configured to communicate at least one position of each of the plurality of seismic nodes with the surface vessel.

2. The system of claim 1, wherein the underwater vehicle is an autonomous underwater vehicle (AUV).

3. The system of claim 1, wherein the underwater vehicle is a remotely operated vehicle (ROV).

4. The system of claim 1, wherein the communications system is a tethered communications system.

5. The system of claim 1, wherein the communications system is an acoustic communications system.

6. The system of claim 1, wherein the plurality of seismic nodes comprises a plurality of autonomous seismic nodes coupled to a deployment cable.

7. The system of claim 1, wherein the plurality of seismic nodes comprises a plurality of sensors coupled to an ocean bottom cable.

8. The system of claim 1, wherein the surface vessel is configured to modify the deployment of the plurality of seismic nodes based on communications received from the underwater vehicle.

9. The system of claim 1, wherein the tracking system is configured to track the cable between each of the plurality of seismic nodes.

10. The system of claim 1, wherein the tracking system is configured to identify the ID, position, depth, and height of each seismic node upon touchdown with the seabed.

11. The system of claim 1, further comprising a second underwater vehicle, wherein the second underwater vehicle monitors the plurality of seismic nodes at a first depth in the sea and the first underwater vehicle monitors the plurality of seismic nodes on or near the seabed.

12. The system of claim 1, wherein the underwater vehicle is configured to monitor the touchdown position of a plurality of seismic nodes on the seabed and communicate the touchdown position of each of the plurality of seismic nodes with the surface vessel at approximately the same time as touchdown.

13. The system of claim 1, further comprising a second surface vessel, wherein the second surface vessel is configured to communicate with the underwater vehicle.

14. The system of claim 1, further comprising a guidance system configured to guide the deployment cable from the surface vessel based upon node position data determined by the tracking system.

15. A subsea tracking system for the deployment of a plurality of seismic nodes on the seabed, comprising
a node tracking system, configured to automatically detect the position of each of the plurality of seismic nodes during deployment to the seabed;
a cable tracking system, configured to automatically detect a portion of a cable between each of the plurality of seismic nodes; and a communications system, configured to transmit the position of the each of the plurality of nodes to a surface vessel.

16. The system of claim 15, wherein the subsea tracking system is located on an AUV.

17. The system of claim 15, wherein the subsea tracking system is located on an ROV.

18. The system of claim 15, wherein the node tracking system is configured to confirm the touchdown position of each of the plurality of seismic nodes.

19. The system of claim 15, wherein the node tracking system is configured to identify the ID, position, depth, and height of each seismic node upon touchdown with the seabed.

20. The system of claim 15, wherein the node tracking system comprises a camera tracking system.

21. The system of claim 15, wherein the node tracking system comprises a sonar tracking system.

22. A method for the deployment of a plurality of seismic nodes on or near the seabed, comprising
positioning an underwater vehicle proximate to the seabed;
deploying a plurality of seismic nodes from a surface vessel, wherein the nodes are coupled to a cable;
determining a node position of each of the plurality of seismic nodes by the underwater vehicle;
automatically tracking each of the plurality of seismic nodes by the underwater vehicle and monitoring a touchdown position of each of the plurality of seismic nodes by the underwater vehicle; and
communicating to the surface vessel the node position of one or more of the plurality of seismic nodes.

23. The method of claim 22, wherein the node position comprises position coordinates, depth, and height of the node.

24. The method of claim 22, further comprising determining a plurality of subsea positions of each of the plurality of seismic nodes and communicating to the surface vessel the node positions.

25. The method of claim 22, further comprising determining a position of one or more of the plurality of nodes by automatically tracking a portion of the cable that is located between the nodes.

26. The method of claim 22, further comprising modifying the deployment position of the cable from the surface vessel based on the touchdown positions of one or more of the plurality of seismic nodes.

27. The method of claim 22, further comprising modifying the deployment position of the deployment cable from the surface vessel based on one or more predicted touchdown positions of the plurality of seismic nodes.

28. The method of claim 22, further comprising modifying the deployment position of the cable from the surface vessel based on a difference between the actual touchdown position of a node and a predetermined seabed position of the node.

* * * * *